United States Patent [19]
Ito et al.

[11] Patent Number: 5,832,510
[45] Date of Patent: Nov. 3, 1998

[54] INFORMATION PROCESSING SYSTEM ENABLING ACCESS TO DIFFERENT TYPES OF FILES, CONTROL METHOD FOR THE SAME AND STORAGE MEDIUM FOR STORING PROGRAMS TO CONTROL THE SAME

[75] Inventors: Hiromichi Ito; Masato Arai, both of Yokohama; Yukio Nakata, Tokyo; Toshiya Ito, Zama; Mitsuru Mori, Atsugi, all of Japan

[73] Assignees: Hitachi, Ltd., Tokyo; Hitachi Software Engineering Co., Ltd., Kanagawa-ken, both of Japan

[21] Appl. No.: 675,055

[22] Filed: Jul. 3, 1996

[30] Foreign Application Priority Data

Jul. 5, 1995 [JP] Japan .................................. 7-170019

[51] Int. Cl.[6] .................................................. G06F 17/30
[52] U.S. Cl. ............................................. 707/201; 707/10
[58] Field of Search .................................. 395/60, 61, 62; 707/201, 10

[56] References Cited

U.S. PATENT DOCUMENTS

| | | | |
|---|---|---|---|
| 5,313,646 | 5/1994 | Hendricks | 395/612 |
| 5,388,257 | 2/1995 | Bauer | 395/601 |
| 5,437,029 | 7/1995 | Sinha | 395/616 |
| 5,548,726 | 8/1996 | Pettus | 395/200.51 |
| 5,555,388 | 9/1996 | Shaughnessy | 395/427 |
| 5,603,019 | 2/1997 | Kish | 395/621 |
| 5,623,666 | 4/1997 | Pike et al. | 395/616 |
| 5,627,996 | 5/1997 | Bauer | 395/500 |
| 5,666,532 | 9/1997 | Saks et al. | 395/621 |

FOREIGN PATENT DOCUMENTS 7-13845 1/1995 Japan .

OTHER PUBLICATIONS

International Conference on Computer Communication. Proceedings of the Conference. Towards a New World in Computer Communication, vol. 11, Jan. 1, 1992, pp. 63–68 "Melogranus: The Design of a Large Scale Distributed Unix File System" by A. Baldini, et al.

Communications of the Association for Computing Machinery, vol. 31, No. 3, Mar. 1, 1988, pp. 288–298 "The Cedar File System" by D.K. Gifford, et al.

Operating Systems Review (SIGOPS), vol. 23, No. 5, Jan. 1, 1989, pp. 45–57, "Spritely NFS: Experiments with Cache–Consistency Protocols", by V. Srinivasan, et al.

*Primary Examiner*—Wayne Amsbury
*Attorney, Agent, or Firm*—Antonelli, Terry, Stout & Kraus, LLP

[57] ABSTRACT

There is provided an information processing system in which files on plural file servers having different file management manners can be efficiently accessed by a single client program, a control method for the information processing system, and a storage medium for storing programs for performing the control. A gateway program 20 is provided on a first server information processing device 120, and an agent program 30 which is operated in conformity with the gateway program 20 is provided on a second server information processing device 130, whereby a copy of the directory structure of files on the second server information processing device is created on the first server information processing device 120. In addition, at the time when the copy is created, data in a file are not copied, and the data copy is performed only when the file is opened by an application program 8a of a client information processing device 110.

45 Claims, 19 Drawing Sheets

2410 — MOUNT VOL1/mpd1 = SRV2:research/hard
2420 — COPYBACKDELAYTIME = 500
2430 — DIRSYNCINTERVAL = 6000

199

INFORMATION PROCESSING SYSTEM ENABLING ACCESS TO DIFFERENT TYPES OF FILES, CONTROL METHOD FOR THE SAME AND STORAGE MEDIUM FOR STORING PROGRAMS TO CONTROL THE SAME

BACKGROUND OF THE INVENTION

1. Field of the Invention

The present invention relates to a file access means for an information processing device, a control method for the file access means and a storage medium for storing programs for controlling the file access means, and particularly to an information processing system having a different-type file access means which is suitably used to access commonly-used files on plural different types of file systems throughout a network, a control method for controlling the information processing system and a storage medium for storing programs to control the information processing system.

2. Description of Related Art

Recent development and propagation of information processing devices such as personal computers, etc. have promoted the use of a data storage manner which is different from a conventional data storage manner. In the conventional data storage manner, users' program files, data files, etc. have been separately and independently stored on respective users' magnetic storage devices for every user's information processing device. On the other hand, in the new data storage manner, the users' program files, data files, etc. are collectively stored in a large-capacity magnetic storage device to enable users having respective information processing devices to commonly use the data.

In general, a server information processing device having a file server program therein is connected through a network to plural client information processing devices, each of which is provided with a client program to access the server information processing device, whereby a file on the server information processing device is accessed from and used by each client information processing device.

Furthermore, in order to maintain file security on the server information processing device, a file server program is generally provided with a user identifying mechanism and a file access authorization setting/checking mechanism which is based on the user identification.

The development of the file common-use system as described above and the widening of the network increase a user's need to access files on plural server information processing devices from a client information processing device.

However, when the file server programs of the plural server information processing devices are of different types, the client information processing device must be provided with client programs which are matched to the respective types of the file server programs. Therefore, there may occur various problems such as that the different types of client programs cannot coexist, that memories required for the operation must be designed in a large hardware scale and that an operating manner is varied in accordance with an access target.

In order to solve these problems, the following method as disclosed in Japanese Patent Application Publication No. Hei-7-13845 was proposed. In this conventional method, a file operating program for transmitting a file on a second server information processing device to a first server information processing device is provided on the first server information processing device, and a file access demand program for instructing the transmission of the file is further provided on a client information processing device.

In the conventional method as described above, a user first starts the file operating program on the first server information processing device by using the file access demand program to perform data transmission of a file from the second server information processing device to the first server information processing device before the file is used on the basis of an instruction from an application or the like. Thereafter, the file thus transmitted is accessed as a file on the first server information processing device. When the content of the file is changed through the access, the file operating program is also instructed to execute the file transmission from the first server information processing device to the second server information processing device by using the file access demand program again. With this operation, the same effect as a direct access of the file on the second server information processing can be obtained. Accordingly, there can be obtained an effect that it is unnecessary to mount plural different client programs on the client information processing device.

In the conventional method as described above, however, the processing for the data transmission from the second server information processing device to the first server information processing device as described above is additionally required, and thus operation performance (i.e., operational convenience) to files on the second server information processing device is degraded as compared with that to files which originally exist on the first server information processing device.

More specifically, in the conventional method, the first server information processing device has no information on the directory structure of the files on the second server information processing device, so that the files on the second file server information processing device cannot be displayed in the form of a file list by using a file list display program created for the first file server program.

Furthermore, no subsequent processing can be started until a file returning/rewriting (copy back) operation from the first server information processing device to the second server information processing device is finished.

In addition, when plural users use the same file at the same time, an unnecessary file transmission may result in a user inadvertently causing undesired file overwriting.

SUMMARY OF THE INVENTION

An object of the present invention is to provide an information processing system which can keep substantially the same operation performance level as a case of accessing a file on a server information processing device having a single file server program, even when accessing files on plural server information processing devices having different file server programs, thereby enabling access to different types of files, a control method for controlling the information processing system, and a storage medium for storing programs to control the information processing system.

Another object of the present invention is to provide an information processing system which can display a list of files on a second server information processing device by a file list display program for a first server information processing device, a control method for controlling the information processing system, and a storage medium for storing programs to control the information processing system.

Another object of the present invention is to provide an information processing system which can reduce the capacity consumption of a file storage device of a first server information processing device even when a directory structure on a second server information processing device is reproduced on the first server information processing device, a control method for controlling the information processing system, and a storage medium for storing programs to control the information processing system.

Another object of the present invention is to provide an information processing system which can reduce the amount of information transmitted from a second server information processing device to a first server information processing device when a directory structure on the second server information processing device is reproduced on the first server information processing device, a control method for controlling the information processing system and a storage medium for storing programs to control the information processing system.

Another object of the present invention is to provide an information processing system which can perform subsequent processing without waiting for the completion of a file returning/rewriting operation from a first server information processing device to a second server information processing device after a client program finishes an access to a file on the second server information processing device and closes the file, a control method for controlling the information processing system and a storage medium for storing programs to control the information processing system.

Another object of the present invention is to provide an information processing system in which even when plural users access the same file on a second server information processing device substantially at the same time, the frequency of a file copy operation from the second server information processing device to a first server information processing device can be reduced to only once, a control method for controlling the information processing system and a storage medium for storing programs to control the information processing system.

Another object of the present invention is to provide an information processing system in which even when access to the same file on a second server information processing device is repeated, the frequency of a file copy operation from the second server information processing to the first server information processing device can be reduced to only once, a control method for controlling the information processing system and a storage medium for storing programs to control the information processing system.

Another object of the present invention is to provide an information processing system in which even when plural users access the same file on a second server information processing device at the same time and alter the content of the file, the frequency of a file returning/rewriting operation from a first server information processing device to the second server information processing device can be reduced to only once, a control method for controlling the information processing system and a storage medium for storing programs to control the information processing system.

Another object of the present invention is to provide an information processing system in which when the same file on a second server information processing device is accessed and the file is erased immediately after the access, a file returning/rewriting operation from the first server information processing device to the second server information processing device is not performed, an control method for controlling the information processing system, and a storage medium for storing programs to control the information processing system.

In order to attain the above objects, according to a first aspect of the present invention, an information processing system includes a first server information processing device having a first file server program which enables files to be commonly used, a second server information processing device having a second file server program which has a different access interface to the commonly-usable files from the first file server program, and a network for connecting the first and second server information processing devices, wherein the first server information processing device includes access means for performing access processing to files managed by the second server information processing device (hereinafter referred to as "different-type files"), and the second server information processing device includes service means for receiving a processing demand transmitted from the access means to perform the processing corresponding to the processing demand, the access means including directory synchronizing means for detecting information on the structure of at least a part of the directory structure of the different-type files through the service means to create, in accordance with the detected information, a copy of the directory structure of the different-type files having a format which can be managed by the first file server program, and to add a copy of the directory structure of the different-type files into the directory structure of files managed by the first server program, and updating the copy of the directory structure of the different-type files every time the detection of the information is performed at a predetermined timing.

More specifically, in the information processing system as described above, the detection of the information is performed, for example, periodically, whereby the directory structure on the second server information processing device is periodically copied onto the first server information processing device.

Furthermore, the information processing system as described above further includes storage means for storing a synchronizing time at which previous directory synchronization is performed, and search means for search different-type files which are updated after the time at which the previous directory synchronization is performed, and transmitting only information of updated files found by the search process from the second server information processing device to the first server information processing device, wherein the copy of the directory structure of the different-type files which is added to the directory structure of the first server information processing device is updated in accordance with the updated files.

Furthermore, in order to attain the other objects, in the information processing system, when the directory synchronizing means creates a copy of a normal file on the first server information processing device, data of the file is not copied, and the file is created, for example, as a sparse file which is defined as a file having no content.

In order to attain the above objects, according to a second aspect of the present invention, an information processing system includes a first server information processing device having a first file server program which enables files to be commonly used, a second server information processing device, having a second file server program, which has a different access interface to the commonly-usable files, at least one client information processing device having a client program which accesses the commonly-usable files on the first server information processing device through the first file server program, a first network for connecting the first server information processing device and the at least one client information processing device, and a second network for connecting the first and second server information processing devices, wherein the first server information processing device includes access means for accessing different type files managed by the second server information processing device, and the second server information processing device includes service means which is activated in correspondence with the access means, and wherein the access means receives a processing demand to a file transmitted from each client program to judge whether the processing demand contains a processing demand to files managed by the second file server program (hereinafter referred to as "different-type files"), and converts the processing demand to the different-type files contained in the processing demand to a second processing demand which is usable in the second file server program and then transmits the second processing demand thus converted to the second server information processing device if the processing demand to the different-type files is contained, and the service means receives the second processing demand transmitted from the first server information processing device and performs a predetermined processing in accordance with the second processing demand.

In the information processing system as described above, the access means includes hook means for hooking an access to a different-type file transmitted from each client program, file copy means for copying data of a file concerned into a directory structure managed by the first file server program through the service means when the access is an open demand to the different-type files, copy back means for returning/rewriting the file copied by the file copy means through the service means to the second server information device, and copy back start means for starting the copy back means as another process when the access is a close demand to the different-type files.

Furthermore, in the information processing system as described above, the name of the copied file, read-open and write-open numbers of the file, a copy back waiting flag, an open waiting flag, a deletion waiting flag, etc. are stored and the execution of the copy back processing is controlled in accordance with the status at that time.

In order to attain the above object, according to a third aspect of the present invention, a control method for the information processing system comprises the steps of detecting information on the structure of at least a part of the directory structure of the different-type file, creating a copy of the directory structure of files which are managed by the second server information processing device, with a format which can be managed by the first file server program, adding the copy of the directory structure thus created into the directory structure of files managed by the first file server program, and updating the copy of the directory structure of the different-type file every time the detection of the information is performed at a predetermined timing.

The control method for the information processing system further comprises the steps of hooking an access to files managed by the second server information processing device (hereinafter referred to as "different-type files") transmitted from the client program, copying the data of a file concerned into the directory structure managed by the first file server program when the access is an open demand to the different-type file, returning/rewriting the file copied by the file copy means to the original file through the service means, and starting the copy back means as another process when the access is a close demand to the different-type files.

According to the information processing system to which the present invention is applied, the control method for the information processing system and the storage medium in which the programs for performing the above control operation are stored, the first file server program can manage not only files to be inherently managed by itself, but also files copied from different-type files which are managed by the second server program or can perform the processing corresponding to the access demand.

Therefore, through the first server file program, a user can access not only the files which are managed by the first server file program, but also files which are managed by the second file server program.

Specifically, the directory synchronizing means periodically copies at least a part of the directory structure on the second server information processing device into the directory structure of the first server information processing device, and thus if a list of files on the first information processing device is displayed, the information on a list of files on the second information processing device can be also obtained at the same time.

Furthermore, the directory synchronizing means sets normal files other than directory files to sparse files having no contents, in file creating process on the first server information processing device which is performed when the directory synchronizing means copies the directory structure of the second server information processing device onto the first server information processing device. Therefore, the storage capacity on a magnetic disk of the first information processing device which is used by the file can be reduced to a very small size irrespective of the file size displayed as a file list.

The search means detects whether a file has been altered, for example by comparing the latest update date of the file on the second server information processing device with a previous synchronizing time at which previous directory synchronization was performed and which is stored in the storage means, and transmits to the first server information processing device only information on files which have been updated since the time at which the previous directory synchronization was performed. According to the information on the updated files, the update means updates the copy of the directory structure of the different-type file which is added into the directory structure of the first server information processing device.

As described above, only the files which have been updated since the time at which the previous directory synchronization was performed are targeted for the synchronization processing, so that the information amount to be transmitted from the second server information processing device to the first server information processing device can be reduced.

Furthermore, the hook means hooks the access demand to the file system of the first server information processing device to judge whether the access demand is an open demand, a close demand or a deletion demand to a file in the copy of the directory structure of the different-type files which are copied and created from the client information processing device by the directory synchronizing means.

If the access demand is judged to be the open demand, the data which are the entity of the file and stored in the file are copied from the second server information processing device to the first server information processing device. At this time, it is checked whether data already exist in the file concerned. Only if no data exist, the copying operation is performed. In addition, the read-open number or the write-open number of the file is set on the basis of the condition that the open demand is a read mode or write mode.

If the access demand is judged to be the deletion demand by the hook means, it is checked whether the file concerned exists, and further it is checked whether the copy back waiting flag is set. If the copy back waiting flag is set, the deletion waiting flag is set.

If the access demand is judged to be the close demand by the hook means, the read open number and the write-open number of the copy file table means are subjected to a subtraction operation in accordance with an open mode of the demanded file under the close operation concerned. As a result, if the write-open number is equal to zero, the copy back means is started as another process and the hook processing itself is finished.

The copy back means sets the copy back waiting flag, and then it waits for a predetermined time while monitoring if the open waiting flag or the deletion waiting flag is set. If the deletion waiting flag is set during the waiting time as described above, the subsequent copy back processing is ceased. On the other hand, if the open waiting flag is set, it performs the copy back processing of returning/rewriting the file copied in the first server information processing device to the second server information processing device without waiting the completion of the waiting time.

If the copy back processing is finished, the open waiting flag has not been set and both the read-open number and the write-open number are equal to zero, the copy of the file concerned is unnecessary, and thus the copy of the file concerned is made a sparse file having no content.

Through the above processing, the copying processing can be effectively performed even when plural users use the same file at the same time. Further, when plural users are using a file or the file is opened again after closed, it can be subsequently used without making the file a sparse file. When the deletion is performed on a file immediately after the file is closed, no copy back is required.

The copy back means operates in the background as another process. Therefore, the close demand from the client information processing device is finished without waiting for the completion of the copy back means, so that a user can immediately perform subsequent processing.

DETAILED DESCRIPTION OF THE PREFERRED EMBODIMENT

A preferred embodiment of the present invention will be described hereunder with reference to the accompanying drawings.

First, the overall construction of the information processing system according to an embodiment of the present invention will be described.

Figure 1:
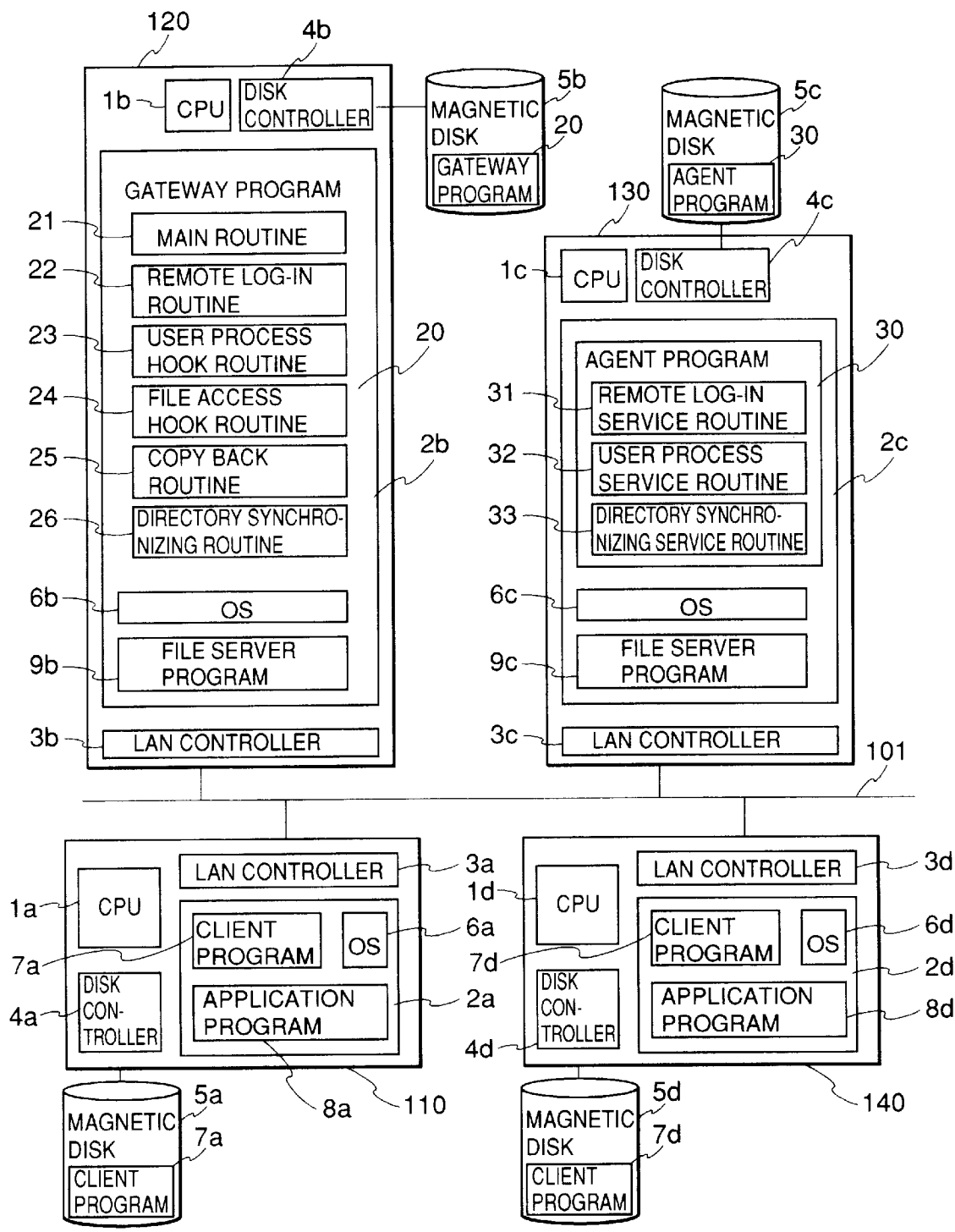
FIG. 1 is a block diagram showing the construction of an embodiment of an information processing system having a different-type file access means to which the present invention is applied.

As shown in FIG. 1, the system of this embodiment includes a first client information processing device 110, a second client information processing device 140, a first server information processing device 120 and a second server information processing device 130.

Each of the client information processing devices 110 and 140 and the server information processing devices 120 and 130 is respectively equipped with a central processing unit (CPU) 1a (1d, 1b, 1c), a memory 2a (2d, 2b, 2c), a LAN controller 3a (3d, 3b, 3c), a disk controller 4a (4d, 4b, 4c), and a magnetic disk 5a (5d, 5b, 5c). The respective information processing devices are connected to one another through a local area network (LAN) 101, and the communication can be performed among these information processing devices through each LAN controller 3.

According to this embodiment, a LAN is used as the network, but, the communication network for connecting the respective information processing device in the present invention is not limited to a LAN, and various communication networks such as a wide area network (WAN), etc. may be used.

An operating system program (OS) 6a, a client program 7a for a file server program 9b, and an application program 8a are loaded onto a memory 2a of the client information processing device 110 from a magnetic disk 5a when the client information processing device 110 is activated. Further, an operating system program (OS) 6d, a client program 7d for a file server program 9c and an application program 8d are loaded from a magnetic disk 5d into a memory 2d of the client information processing device 140 when the client information processing device 140 is activated.

A gateway program 20, an operating system (OS) 6b and a first file server program 9b are loaded from a magnetic disk 5b into a memory 2b of the first server information processing device 120 when the first server information processing device 120 is activated. Further, an agent program 30, an operating system (OS) 6c and a second file server program 9c are loaded from a magnetic disk 5c into a memory 2c of the second server information processing device 130 when the second server information processing device 130 is activated. These programs can be stored on a storage medium such as a hard disk device, a floppy disk device or the like from/into which information can be read/written by a computer.

The gateway program 20 and the agent program 30 of these programs which are loaded to these servers correspond to the main elements of the present invention, and the other elements are used in the conventional file server system.

The following description of this embodiment is made on the assumption that the gateway program 20 is stored in the first server information processing device 120 and the agent program 30 is stored in the second server information processing device 130. However, each server information processing device may be stored with such a gateway program and agent program so that an access to and from the other server information processing device can be performed.

A user of the client information processing device 110 (hereinafter merely referred to as "user") logs into the file server program 9b of the server information processing device 120 through the client program 7a to access commonly-usable files (hereinafter referred to as "common files") on the magnetic disk 5b from the application program 8a.

According to the gateway program 20 and the agent program 30 of this embodiment, in the system, a user can access the common files on the magnetic disk 5c using the same method as the access to the common files on the magnetic disk 5b.

The gateway program 20 includes a main routine 21 for performing initialization and termination processing, a remote log-in routine 22 for detecting user's log-in to the first file server program 9b and instructing an automatic log-in to the second file server program 9c, a user process routine 23 for performing the automatic log-in for each user, a file access hook routine 24 for hooking a file access request from the user and redirecting the access request from the user to the second server information processing device 130, a copy back routine 25 for returning/rewriting into the second server information processing device 130 a file which is copied from the second server information processing device 130 onto the first server information processing device 120 and then corrected (changed), and a directory synchronizing routine 26 for creating, on the first server information processing device 120, the same structure as an indicated part of the director structure on the second server information processing device 130.

The agent program 30 includes a remote log-in service routine 31 for receiving a log-in demand from the user process routine 23, a user process service routine 32 which is started when the log-in demand is received to perform the log-in to the second file server program 9c and then respond to the file access request from each user which is re-directed by the file access hook routine 24, and a directory synchronization service routine 33 for transmitting the directory structure information of the second server information processing device 130 to the first server information processing device 120 in response to the demand from the directory synchronizing routine 26.

Next, the operation of the system of this embodiment will be described.

Figure 21:
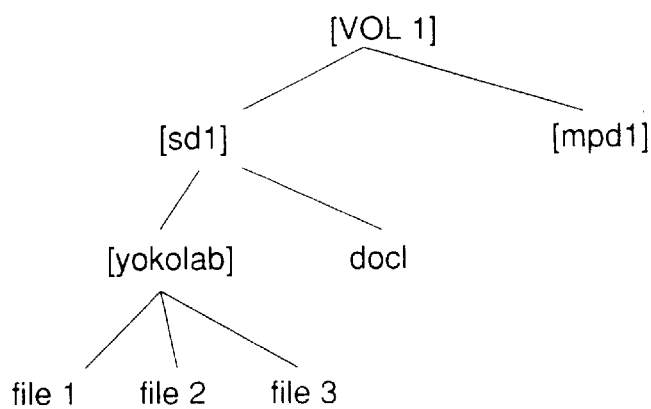
FIG. 21 is a diagram showing a directory structure of a first server information processing device 120 of the embodiment shown in FIG. 1.
Figure 22:
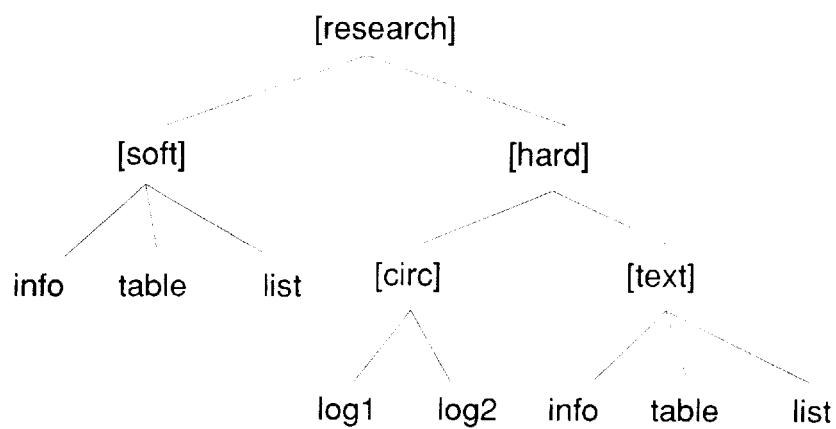
FIG. 22 is a diagram showing a directory structure of a second server information processing device 130 of the embodiment shown in FIG. 1.

FIG. 21 is a diagram showing an example of the directory structure of files which are created on the magnetic disk 5b of the first server information processing device 120 before the gateway program 20 is started. Here, a file whose file name is illustrated as being surrounded by parentheses "[]" corresponds to a directory file, and the directory file contains file information on those files which are linked to one another under the directory file. FIG. 22 is a diagram showing an example of the directory structure of those files which are created on the magnetic disk 5c of the second server information processing device 130.

Figure 23:
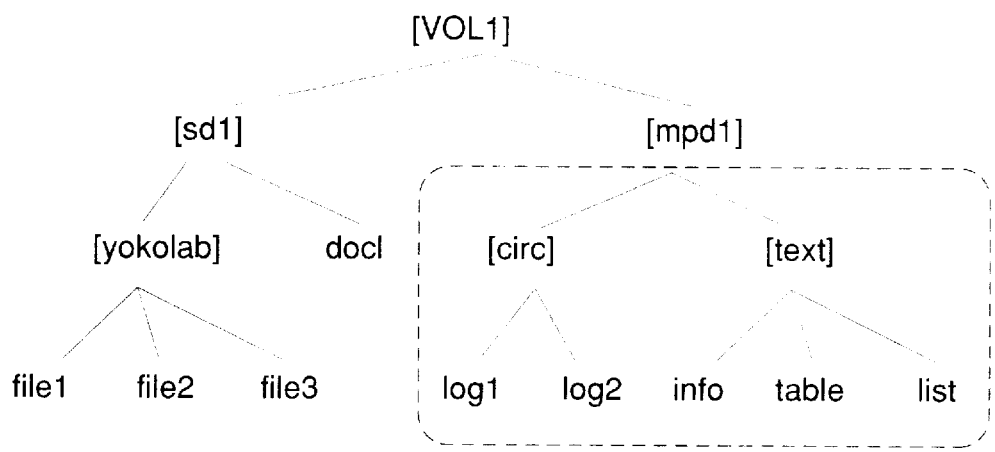
FIG. 23 is a diagram showing a directory structure of the first server information processing device when the gateway program 20 of the embodiment shown in FIG. 1 is operated.

According to this embodiment, when the gateway program 20 is started, the directory structure of files on the magnetic disk 5b of the first server information processing device 120 is designed as shown in FIG. 23, for example. A portion of the directory structure which is surrounded by a broken line in FIG. 23 corresponds to a copy of a subordinate directory structure which extends subordinately from "research/hard" in the directory structure on the second server information processing device 130 shown in FIG. 22 by the function of the directory synchronizing routine 26 as described above.

The files in the copied directory structure are created on the magnetic disk 5b as normal files which are managed through the OS 6b by the file server program 9b. Accordingly, a part of the directory structure on the second server information processing device 130 can be checked as a part of the directory structure on the first server information processing device 120 by the application software 8a on the client information processing device 110.

Here, with respect to normal files which are contained in the copied directory structure, but not directory files, the data of the normal files are not copied from the second server information processing device 130 to the first server information processing device 120, and these normal files are made as sparse files each of which contains only dummy data of 1 byte.

Figures 24, 25:
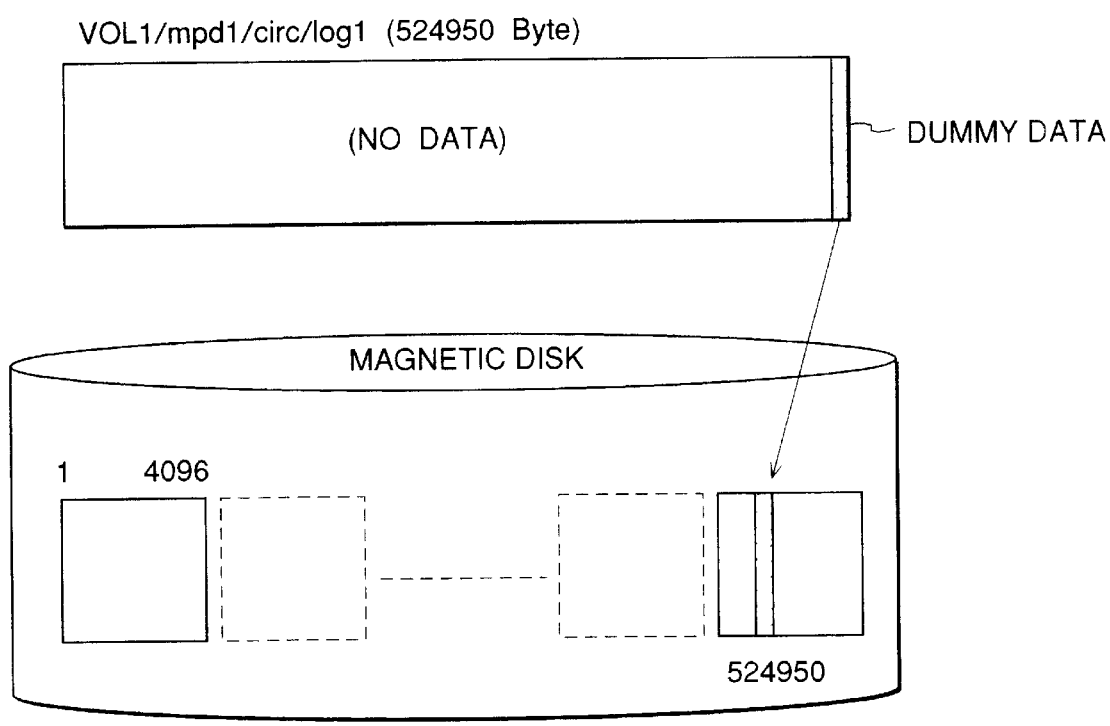
FIG. 24 is a diagram showing a gateway parameter setting file 199 of the embodiment shown in FIG. 1.
FIG. 25 is a diagram showing the structure of a sparse file in the embodiment of FIG. 1.

FIG. 25 shows the structure of the sparse file. Here, a file of VOL1/mpd1/circ/log1 has a file size of 524950 bytes, but has only data of one byte which is written at 524950-th byte from the head. In such a file, only the head block and the final block actually use the storage area on the magnetic disk 5b, and the other blocks use no storage area on the magnetic disk 5b. In this embodiment, since the block size is set to 4096 bytes, the storage capacity of the magnetic disk 5b which is actually used by the normal file (sparse file) needs only 8192 bytes which correspond to twice of 4096 bytes although the file size is set to 524950 bytes.

As described above, by using sparse files each having no entity (data) as files in a copied directory structure, the file size as file information is allowed to reflect the size of the original of the copy, and the use storage capacity of the magnetic disk 5b can be reduced.

The access to the file data from the application program 8a of the client information processing device 110 is performed as follows.

The file access hook routine 24 of the gateway program 20 detects a file open demand for a file from the application program 8a and then copies and overwrites the data of the file from the second server information processing device 130 onto the corresponding sparse file on the first server information processing device 120. The read/write access to the file from the application program 8a after the file is opened is performed without using the gateway program 20. On the other hand, when a close demand from the application program 8a is detected, it is checked whether the data writing into the file has been performed. If the data writing has been performed, the copy back routine 25 returns/rewrites (hereinafter referred to as "copy back") the data of the file concerned to the second information processing device 130. After the file is closed, the file concerned on the first information processing device is reset as the sparse file as described above. The copy back processing is performed under the background with no connection with a user once a start instruction of the copy back is issued. Therefore, the application program 8a can perform subsequent processing without waiting for the copy back processing. Further, the copy back processing is not started immediately after the file is closed, but is started after a predetermined time elapses. This predetermined time is referred to as "copy back delay time".

FIG. 24 shows an example of a gateway parameter setting file 199 which is created by a system manager and stored on the magnetic disk 5b. A first line (2410) in FIG. 24 indicates which part of the directory structure on the second information processing device 130 should be allocated to which directory on the first information processing device 120. In this case, the directory structure named as "SRV2" which is located below "research/hard" of the second server information processing device 130 is allocated to "VOL1/mpd1" of the first server information processing device 120. A second line (2420) indicates a copy back delay time corresponding to a period from the time when the application program 8a closes a file until the time when the copy back routine 25 starts the copy back of the file. In this case, the second line indicates 500 milliseconds. A third line (2430) indicates a time interval for directory synchronization. In this case, the time interval is set to 6000 milliseconds, that is, ten minutes.

The processing of each routine as described above will be described in detail.

First, prior to the description of the routines, tables which are set and referred to in the memory 2b during each routine in the gateway program 20 will be described.

Figure 14:
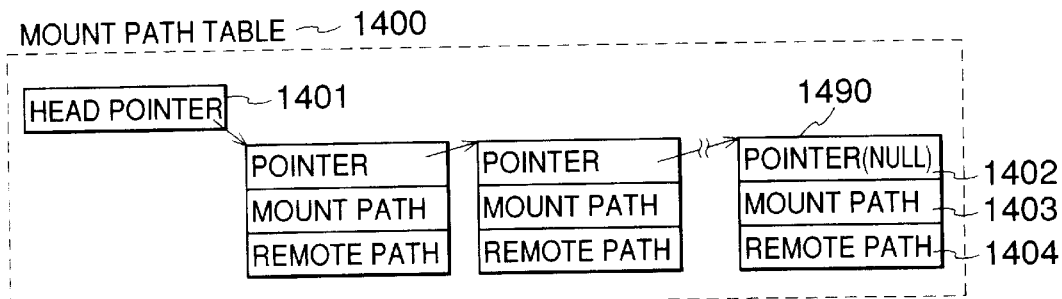
FIG. 14 is a diagram showing a mount path table 1400 of the embodiment shown in FIG. 1.

FIG. 14 shows a mount path table 1400. The mount path table 1400 contains information which is described in the gateway parameter setting file 199 and represents which part of the directory structure on the second information processing device 130 should be allocated to which directory on the first information processing device 120. In order to enable plural allocations, the mount path table 1400 has a linear list structure which comprises plural nodes 1490 and a head pointer 1401 indicating a first node. Each node 1490 is provided with a pointer 1402 indicating a subsequent node, a mount path 1403 which is a path for a directory of the first information processing device 120, and a remote path 1404 which is a path for a directory of the second information processing device 130. The pointer 1402 of the last node is provided with "NULL" indicating "empty".

Figure 15:
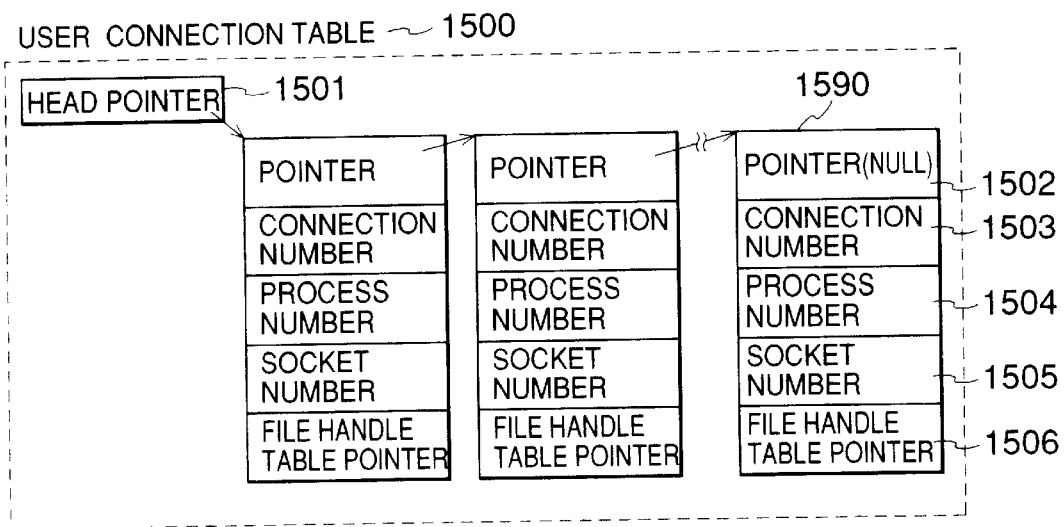
FIG. 15 is a diagram showing a user connection table 1500 of the embodiment shown in FIG. 1.

FIG. 15 shows a user connection table 1500. The user connection table 1500 comprises a head pointer 1501 indicating a first node, and plural nodes 1590 which are allocated to respective log-in users. Each node 1590 includes a pointer 1502 indicating a subsequent node, a connection number 1503 which is allocated to a log-in user by the first file server program 9b, a process number 1504 of a user process which is activated and allocated on a user basis by the log-in routine 22, a socket number 1505 with which the user process communicates with the user service routine 32 of the agent program 30, and a file handle table pointer 1506 which is a pointer to the file handle table 1600 for storing information of files on the second information processing device 130 which are being used by respective users.

Figure 16:
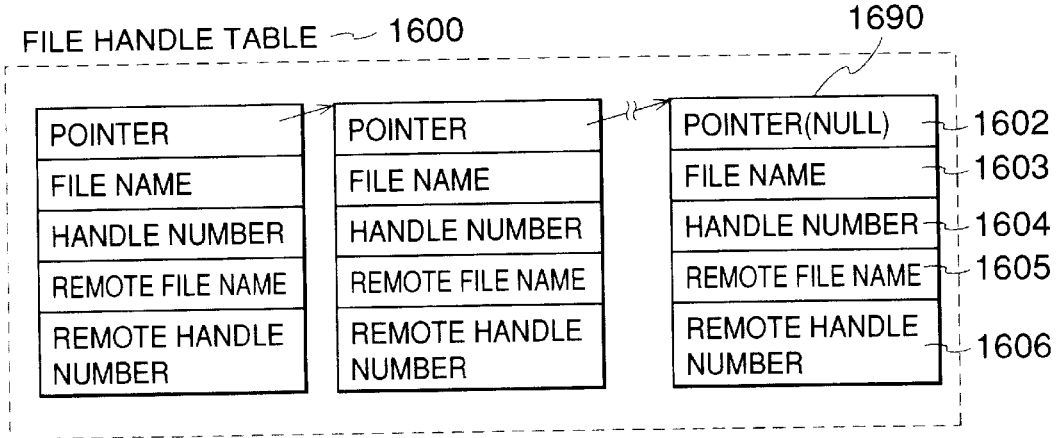
FIG. 16 is a diagram showing a file handle table 1600 of the embodiment shown in FIG. 1.

FIG. 16 shows an example of file handle table 1600. This table is created for every user, and each node 1690 of the table includes a pointer 1602 indicating a subsequent node, a file name 1603 containing a path name on the first information processing device 120, a file handle number 1604 which is given from the OS 6b when the file concerned is opened, a remote file name 1605 containing a path name on the second information processing device 130, and a remote file handle number 1606 which is given from the OS 6c when the file concerned is opened.

Figure 17:
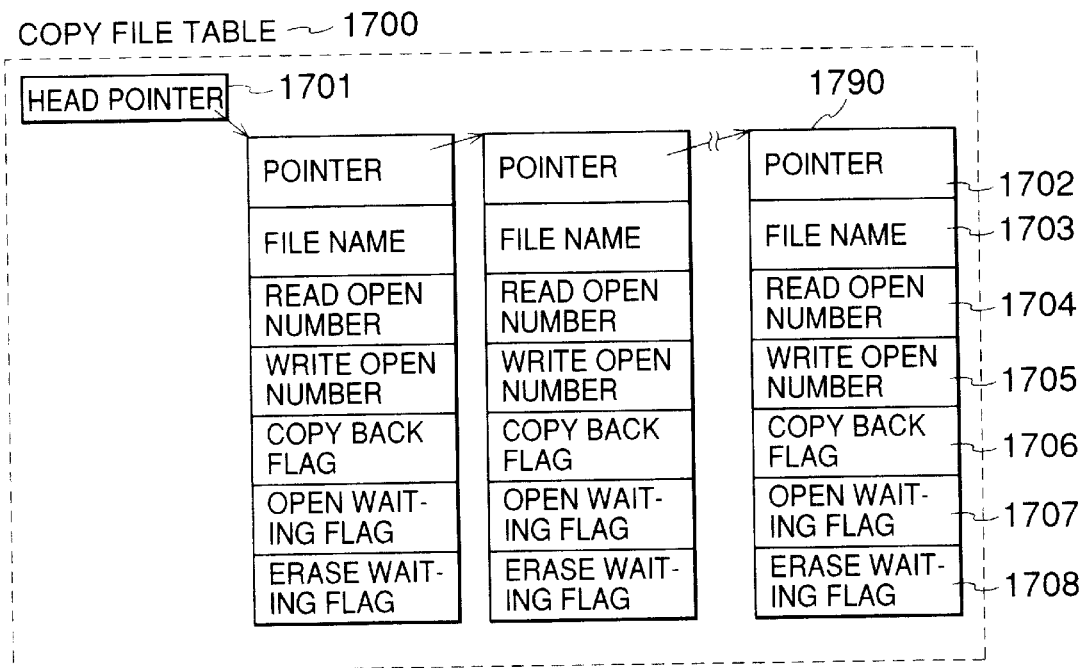
FIG. 17 is a diagram showing a copy file table 1700 of the embodiment shown in FIG. 1.

FIG. 17 shows a copy file table 1700 indicating information on files whose data are temporarily copied from the second information processing device to the first information processing device. The copy file table 1700 comprises a head pointer 1701 indicating a first node, and plural nodes 1790 each corresponding to each file as described above. Each node 1790 includes a pointer 1702 indicating a subsequent node, a file name 1703 containing a path name on the first information processing device 120, a read open number 1704 indicating the number of times the files has been opened in a read mode on the first information processing device 120, a write open number 1705 indicating the number which is opened for the file concerned in a write mode on the first information processing device 120, a copy back flag 1706 indicating that the file concerned is copied back to the second information processing device 130, an open waiting flag 1707 indicating that there is a process which is waiting for the opening of the file concerned, and a deletion waiting flag 1708 indicating that there is a process which is waiting for the deletion of the file concerned.

Next, the details of the process flow of each routine will be described.

Figure 2:
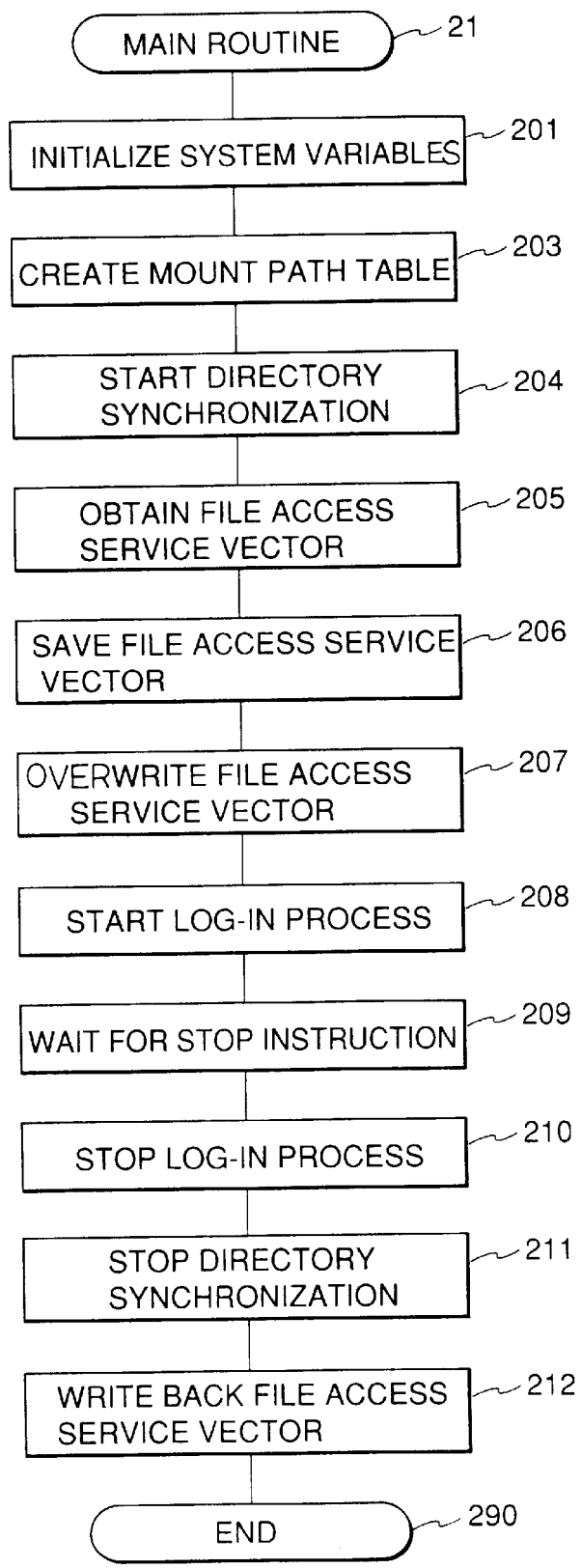
FIG. 2 is a flowchart for a process flow of a main routine 21 of a gateway program 20 according to the embodiment shown in FIG. 1.

First, the process flow of the main routine 21 of the gateway program 20 will be described with reference to FIG. 2.

In the process flow of the main routine 21, in step 201, system variables such as the head pointer 1501 of the user connection table 1500, etc. are initialized. In step 203, the mount path table 1400 is created by referring to the gateway parameter setting file 199 which is created beforehand by a system manager and stored on the magnetic disk 5b.

In step 204, the directory synchronizing routine 26 is started as a new process, and a part of the directory structure on the magnetic disk 5c of the second information processing device 130 is reproduced on the magnetic disk 5b of the first information processing device 120 in accordance with the corresponding relationship which is set in the mount path table 1400. The respective processes are performed in parallel by the time slice function of the OS.

In steps 205 to 207, in order to hook a file access demand issued from the file server program 9b or the like, a service vector of a function call to the file system of the OS 6b is rewritten. Here, the service vector is a branch destination address to be referred to by a software interruption command of the CPU 1b which is executed when the function call is issued. First, the service vector of the function call which is set by the OS 6b in step 205 is obtained, and in step 206 the service vector is stored as system variables. In step 207, an entry address of the file access hook routine 24 in the gateway program 20 is set as a new file access service vector, thereafter the setting operation for hooking the file access demand is finished.

Subsequently, in step 208 the log-in routine 22 is started as a new process to start a log-in monitoring operation from the user. In step 209, the process keeps itself under a sleep state to wait for a stop command. At this time, the initialization of the gateway program 20 is finished, and the user is allowed to access files on the second information processing device 130.

When the system manager issues the stop command of the gateway program 20, the main routine is released from the sleep state and performs the end processing subsequent to the step 210. In step 210, a signal to finish the log-in routine 22 is transmitted to the log-in process, and likewise, an end instruction to the directory synchronizing process is transmitted in step 211. In step 212, the file access service vector which is rewritten in step 207 is returned to the original value which is saved in step 206, thereafter finishing the main routine 21.

Figure 3:
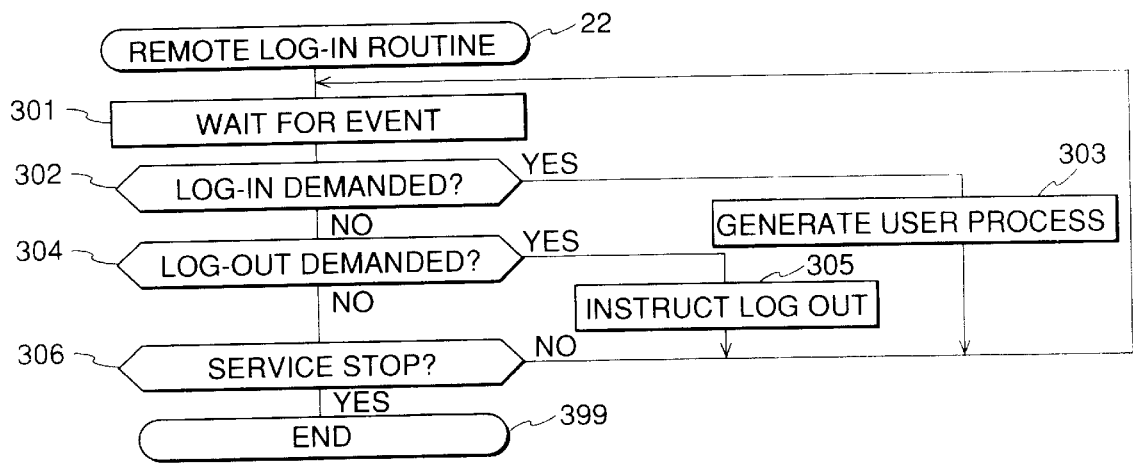
FIG. 3 is a flowchart for a process flow of a remote log-in routine 22 of the gateway program 20 of the embodiment shown in FIG. 1.

Next, the process flow of the remote log-in routine 22 will be described with reference to FIG. 3. In the process flow of the remote log-in routine 22, in step 301, the process is on standby while monitoring events such as user's log-in or log-out to the file server program 9b, the log-in process stop instruction from the main routine 21 as described above, etc. When the event occurs, it is judged in step 302 whether the event is the user's log-in. If it is the user's log-in, the user process routine 23 is started as a new process in step 303.

On the other hand, if it is judged in step 302 that the event is not the user's log-in, the process executes the step 304 to check whether the event is the user's log-out. If it is the user's log-out, the process executes the step 305, and if not, the process executes the step 306. In step 305, the user connection table 1500 as described above is referred to so that the user process number 1504 is checked on the basis of the connection number 1503 of a log-out demander, and a log-out instruction signal is transmitted to the process concerned.

In step 306, it is judged whether the occurring event is the service stop instruction. If it is the service stop instruction, the log-in process is finished. If it is an event other than the stop instruction, the process waits for the event in step 301.

Figure 4:
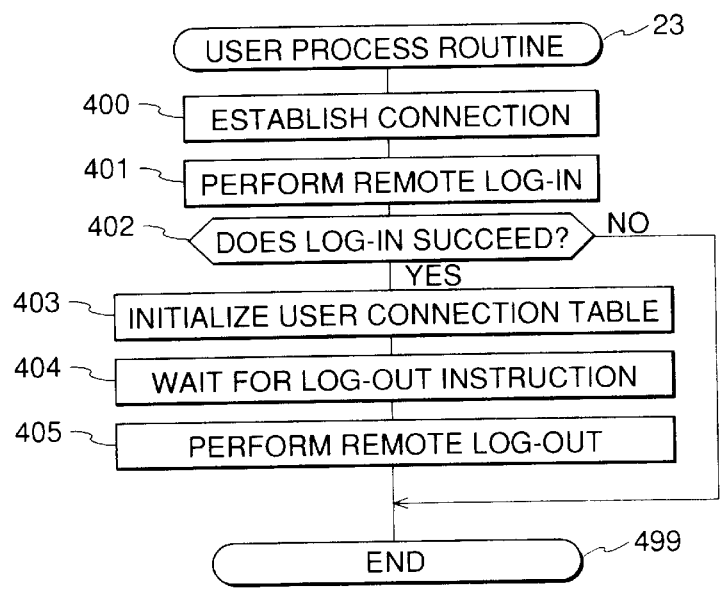
FIG. 4 is a flowchart for a process flow of a user process routine 23 of the gateway program 20 of the embodiment shown in FIG. 1.

Next, the process flow of the user process routine 23 which is generated and started in step 303 of the log-in routine 22 will be described with reference to FIG. 4. In this process flow, in step 400, a socket is first created for the remote log-in service routine 31 of the agent program 30 on the second information processing device 130 to establish a new communication connection. Subsequently, in step 401, the log-in to the second file server program 9c is requested to the remote log-in service routine 31.

At this time, the remote log-in service routine 31 first starts the user process service routine 32 as a new process, and performs the log-in at this stage. The user process service routine 32 transmits the log-in result to the user process routine 23 by using socket which is taken over from the remote log-in service routine 31. In step 402, the log-in result is judged. If the result is the success in log-in, the process performs the processing subsequent to the step 403. If the result is the failure in log-in, the user process routine is finished.

In step 403, a new node 1590 is added to the user connection table 1500 to set new values to the connection number 1503, the process number 1504, the socket number 1505 and the file handle table pointer 1506. In subsequent step 404, the process waits under a sleep state until it receives a log-out instruction from the log-in routine 22. When receiving the log-out instruction, in step 405 the log-out from the second file server program 9c is requested to the user process service routine 32, and performed. After the log-out, the user process routine 23 is finished.

Next, the process flow of the file access hook routine 24 will be described with reference to FIG. 5.

By the rewriting of the file access service vector which is performed in the main routine 21 as described above, this routine is called every time the function call to the file system of the OS 6b is issued.

When this routine is called, it is checked in step 501 whether the connection number of a file access demander is in the user connection table 1500. If the connection number is judged not to exist in the user connection table 1500, it is judged not to be a demander (user) which is a file-access re-direct target. Therefore, in step 560, an original vector is called and inherent processing is performed, thereafter returning to a caller of this routine in step 599.

In step 502, it is checked whether a file to which a file access demand is made (hereinafter referred to as "demand file") is contained in a directory portion on which the directory of the second information processing device 130 is mounted. This check is performed by referring to the mount path table 1400 and comparing the mount path 1403 and the complete path name of the demand file.

When the file access demand is the close demand, not the file name, but the file handle number is delivered. In this case, the head pointer of the file handle table 1600 of the user concerned is obtained from the file handle table pointer 1506 of the user connection table 1500, and subsequently it is checked whether the corresponding file handle number 1604 exists in the file handle table 1600 which is indicated by the pointer. If the file is not a target file, the original vector is called in step 560 to perform the original processing, thereafter returning to the caller of this routine in step 599.

Subsequently, in steps 505, 510, 520, 530 and 540, it is judged whether the demand is any one of a file open demand, a file close demand, a file deletion demand, a directory creation demand and a directory deletion demand.

When it is the file open demand, the open pre-hook routine 50 is first called in step 506. In step 507, it is judged whether the call result is an error. If it is judged to be the error, the process skips the subsequent step 508. In step 508, by referring to the saved original file access service vector to call the address thereof, the open processing is demanded to the file system of the OS 6b (hereinafter, such an operation is merely referred to as "call original vector"). Subsequently, in step 509, the open post-hook routine 51 is called, thereafter returning to the caller of the file open in step 599.

When the demand is the file close demand, the close pre-hook routine 53 is first called in step 511. In step 512, it is judged whether the call as described above is an error. If it is the error, the process skips the subsequent step 513. In step 513, the original vector is called, thereafter returning to the caller of the file close in step 599.

Figure 5:
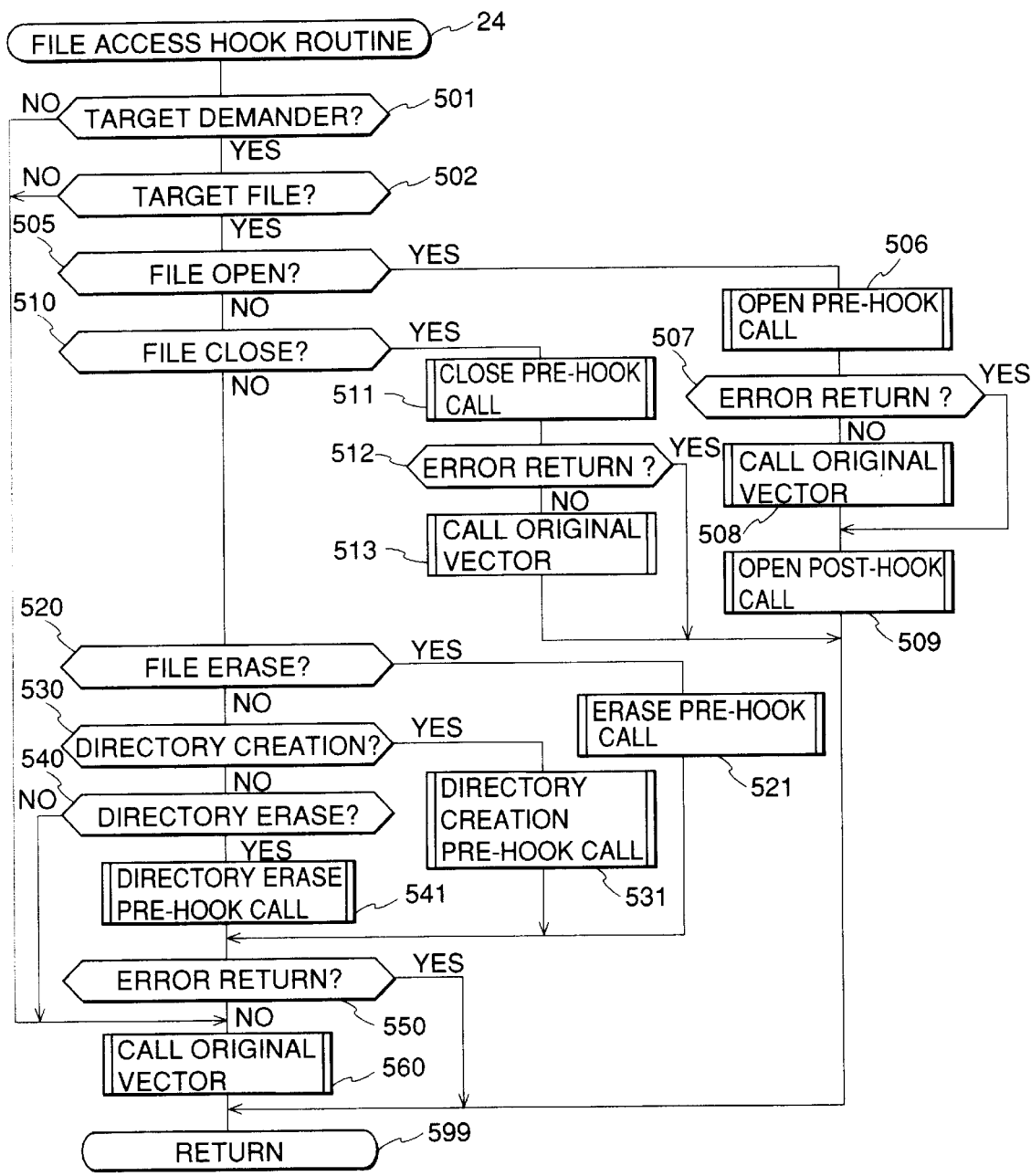
FIG. 5 is a flowchart for a process flow of a file access hook routine 24 of the gateway program 20 of the embodiment shown in FIG. 1.

The same processing as the file close is performed for the file deletion demand, the file directory creation demand and the directory deletion demand as shown in FIG. 5.

As described above, by the processing of the file access hook routine 24 of this embodiment, the file access demand to the OS 6b is hooked, so that each processing routine to re-direct to the file access of the second information processing device can be called.

Figure 6:
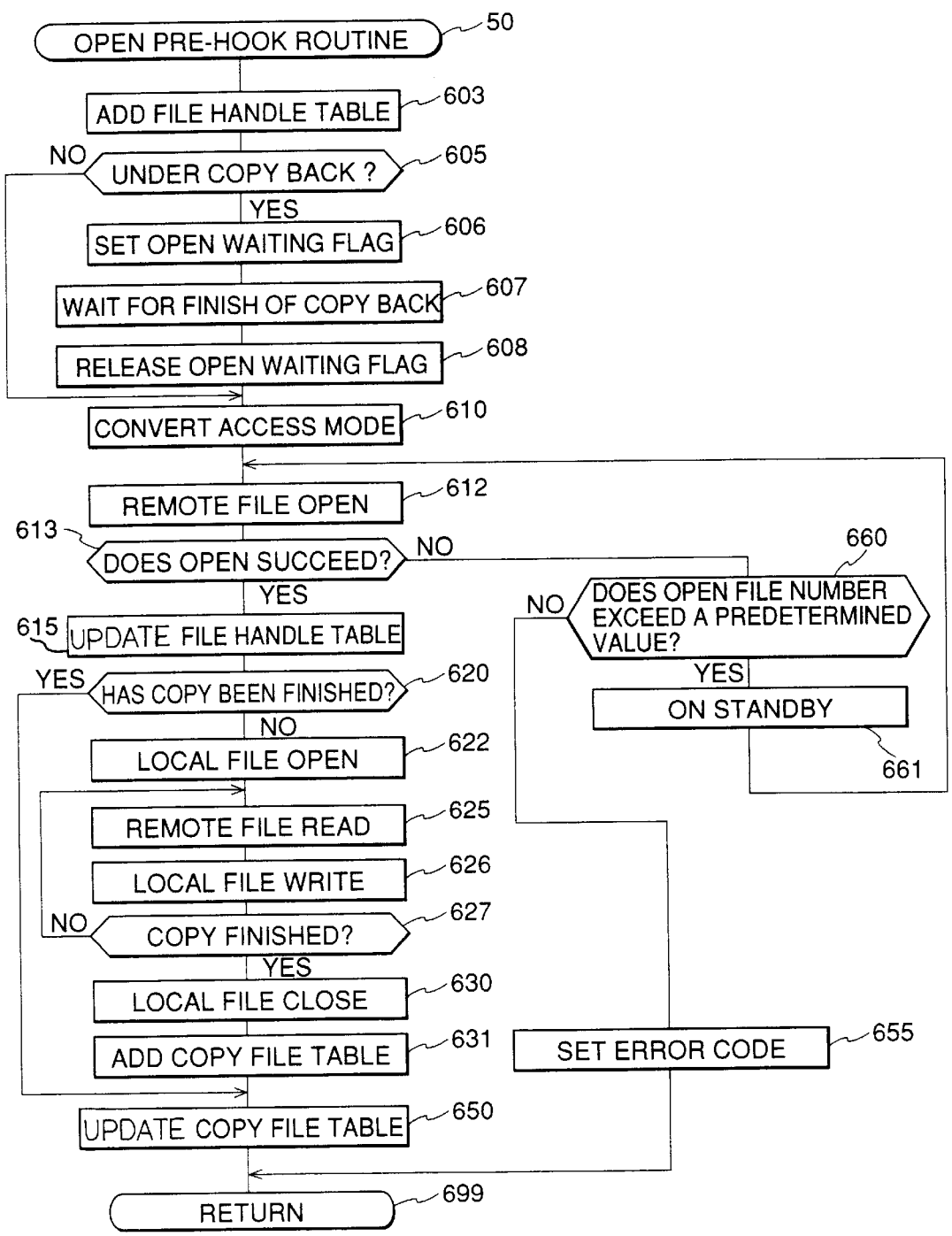
FIG. 6 is a flowchart for a process flow of an open pre-hook routine 50 of the gateway program 20 of the embodiment shown in FIG. 1.

Next, the process flow of the open pre-hook routine 50 will be described with reference to FIG. 6. This routine is called in step 506 of the file access hook routine 24 of FIG. 5.

In this process flow, a new node 1690 is first added to the file handle table 1600 in step 603. In step 605, it is checked whether the demanded file name exits in the file names 1703 of the respective nodes 1790 of the copy file table 1700. If it exists, the copy back flag 1706 of the node 1790 concerned is referred to. If the node is under copy back, the open waiting for flag 1707 of the node 1790 is set in step 606, and the copy back flag 1706 of the node concerned is monitored in step 607, thereafter waiting the finish of the copy back. When the copy back is finished, the open waiting flag 1707 is released in step 608. The judgment result of the step 605 indicates that the node is not under copy back, the steps 606, 607 and 608 are not performed.

In step 610, the open mode of the demand file is converted to an equivalent open mode which can be received by the second file server program 9c and can serve as an open mode of the demander. Here, the open mode is defined as a mode indicating whether a file should be opened in the read mode or in the write mode, whether a file should be created if no file exists, and whether an exclusive control operation is performed.

In step 612, the open of the file on the second information processing device 130 which corresponds to the demand file is requested to the user process service routine 32 of the agent program 30. At this time, the open mode after the conversion as described above is used. When receiving the result of the open from the user process service routine 32, it is judged in step 613 whether the open succeeds. If the open fails, a step 660 is executed.

In step 660, the cause of the failure is investigated. If the open fails because the open file number exceeds a predetermined value, the process waits in step 661, and then returns to the step 612 to retry. If the open fails owing to a different cause, in step 665, an error code is set, thereafter returning to the caller in step 699.

This retry processing is needed for the following reasons. That is, the numbers of simultaneously-openable files which are permitted by the first OS 6b and the second OS 6c respectively are different from each other, and since plural copy back routines 25 are performed in a multiprocess, files whose number is larger than the number of the files which are opened through the file server program 9b are actually opened at the same time. If the open succeeds in step 613, the file handle number transmitted from the user process service routine 32 at the open time is stored into the remote file handle number 1605 of the node 1690 concerned of the file handle table 1600 in step 615. Subsequently, in step 620, the copy file table 1700 is searched to check whether the data of the demanded file have been already copied from the second information processing device 130 to the first information processing device 120. If the data have been already copied, a step 650 is executed. If the data have not yet been copied, a step 622 is executed.

In the steps 622 to 630, the data of the demanded file are copied from the second information processing device 130 onto the first information processing device 120. First, in step 622, the open of the demanded file is instructed to the OS 6b of the first information processing device 120. If there is no file, a file is newly created. Subsequently, in step 625, the data of the file concerned are read out from the second information processing device 130. The read-out operation is performed through the user process service routine 32. The read-out data are written into the demanded file which is made a sparse file on the first information processing device 130 in step 626. In step 627, it is judged whether the copy of all the contents is completed. If it is not completed, the steps 625 to 627 are repetitively executed. In step 630, the close of the demanded file is instructed to the OS 6b of the first information processing device 120.

In step 631, a new node 1790 is added to the copy file table 1700 and a file name 1703 on the first information processing device 120 is set. In step 650, 1 is added to one or both of the read open number and the write open number of the node 1790 in accordance with the open mode of the demanded file. After the processing as described above, in step 699, the open pre-hook routine is completed, and then the process returns to the caller.

Figure 7:
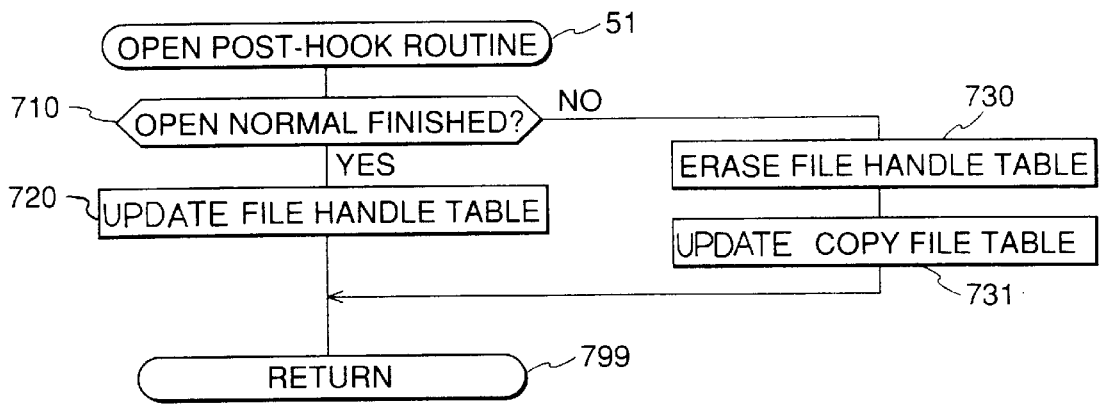
FIG. 7 is a flowchart for a process flow of an open post-hook routine 51 of the gateway program 20 of the embodiment shown in FIG. 1.

Next, the process flow of the open post-hook routine 51 will be described with reference to FIG. 7.

In step 710, by calling the original vector before this routine is called, it is checked whether the file open to the executed OS 6b is normally completed. If it is judged to be normally completed, a step 720 is executed. In step 720, the file handle number which is returned from the OS 6b through the file open as described above is stored in the local file handle number 1604 of the node 1690 concerned of the file handle table 1600.

On the other hand, if the file open to the OS 6b is judged to be abnormally completed, the open as described above is invalidated, and the step 730 and subsequent steps are executed to deletion information of registration to each table. In step 730, the node 1690 concerned of the file handle table 1600 which is added in the open pre-hook routine 50 is deleted. In subsequent step 731, the read open number 1704 and the write open number 1705 of the copy file table 1700 which are counted up in the open pre-hook routine 50 are returned to the values before the countup. After the processing as described above, the process returns to the caller in step 799, and the open post-hook routine 51 is finished.

Figure 8:
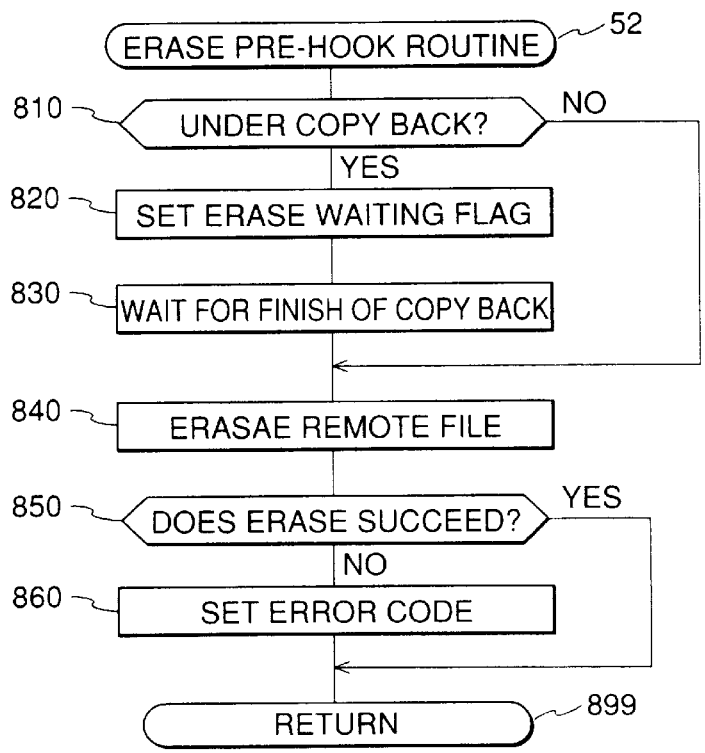
FIG. 8 is a flowchart for a process flow of a deletion pre-hook routine 52 of the gateway program 20 of the embodiment shown in FIG. 1.

Next, the process flow of the deletion pre-hook routine 52 will be described with reference to FIG. 8.

First, in step 810, it is checked whether a demanded file name exists in the file name 1703 of each node 1790 of the copy file table 1700. If the demanded file name exists, the copy back flag 1706 of the node 1790 is referred to. If the reference result indicates that the node is under copy back, the deletion waiting flag 1707 of the node 1790 concerned is set in step 820, and monitors the copy back flag of the node concerned in step 830, waiting for the completion of the copy back.

If the node is not under copy back or the copy back is finished, step 840 is executed. In step 840, the deletion of the file on the second information processing device 130 which corresponds to the demanded file is requested to the user process service routine 32 of the agent program 30. In step 850, it is judged whether the deletion is normally finished. If it is abnormally finished, an error code is set in step 860, and the process returns to the caller in step 899.

Figure 9:
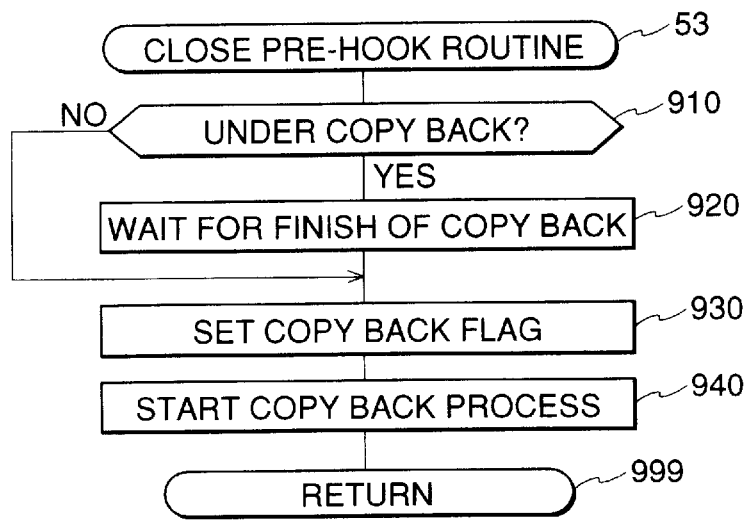
FIG. 9 is a flowchart for a process flow of a close pre-hook routine 53 of the gateway program 20 of the embodiment shown in FIG. 1.

Next, the process flow of the close pre-hook routine 53 will be described with reference to FIG. 9.

First, in step 910, it is checked whether the demanded file name exists in the file name 1703 of each node 1790 of the copy file table 1700. If it is judged to exist, the copy back flag 1706 of the node is referred to. If the reference result indicates that the node is under copy back, the copy back flag 1706 of the node concerned is monitored in step 920, and waits for the completion of the copy back.

If the node is not under copy back or the copy back is finished, the copy back flag 1706 is set in step 930. Subsequently, in step 940, the copy back routine 25 is newly started as a new process, and the process returns to the caller in step 999.

Figure 10:
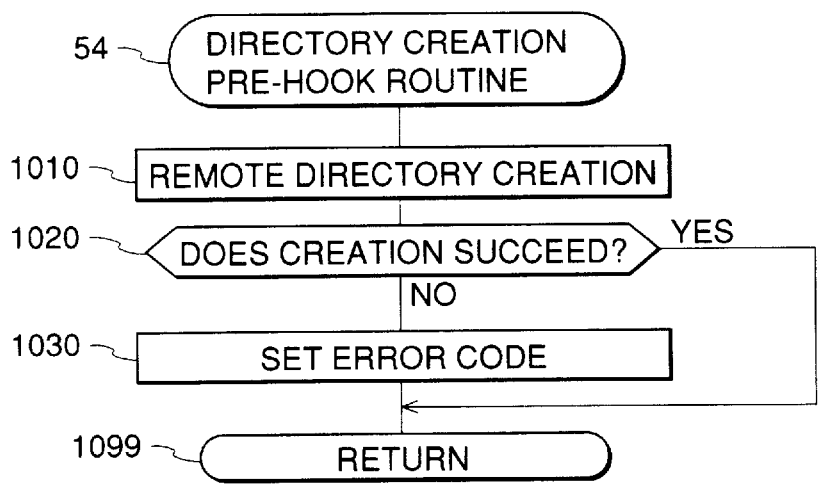
FIG. 10 is a flowchart for a process flow of a directory creating pre-hook routine 54 of the gateway program 20 of the embodiment shown in FIG. 1.

Next, the process flow of the directory creation pre-hook routine 54 will be described with the reference to FIG. 10.

First, in step 1010, the creation of the directory on the second information processing device 130 which corresponds to the demanded directory is requested to the user process service routine 32 of the agent program 30. In step 1020, it is checked whether the creation is normally finished. If the creation is abnormally finished, an error code is set in step 1030, and the process returns to he caller in step 1099.

Figure 11:
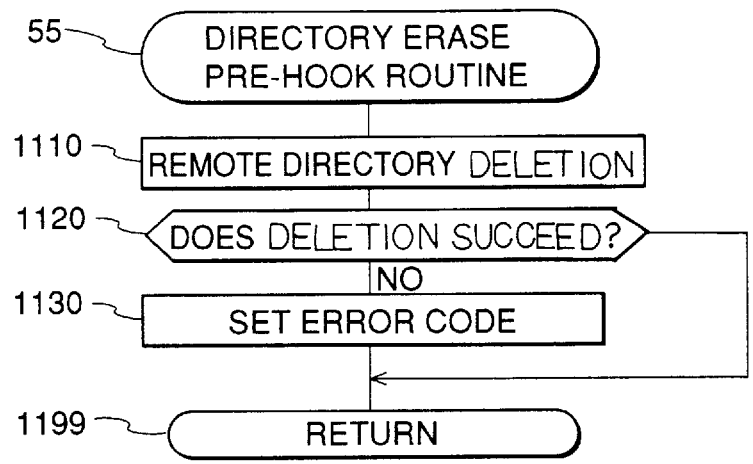
FIG. 11 is a flowchart for a process flow of a directory deletion pre-hook routine 55 of the gateway program 20 of the embodiment shown in FIG. 1.

The process flow of the directory deletion pre-hook routine 55 will be described with reference to FIG. 11. This routine is similar to the directory creation pre-hook routine 54 except that the creation is replaced by the deletion, and thus the description thereof is omitted.

Figure 13:
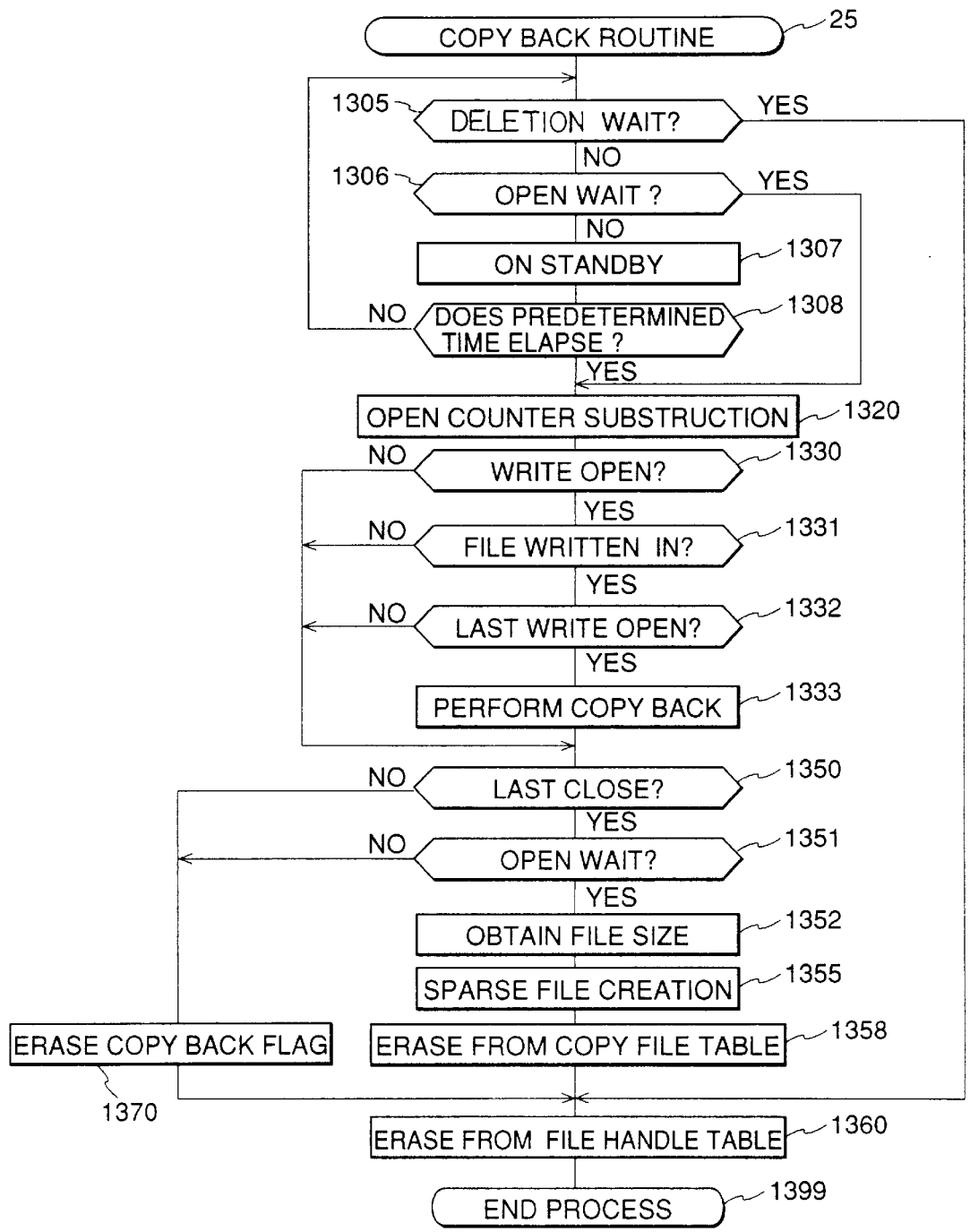
FIG. 13 is a flowchart for a process flow of a copy back routine 25 of the gateway program 20 of the embodiment shown in FIG. 1.

Next, the process flow of the copy back routine 25 will be described with reference to FIG. 13.

When this routine is started as a process, in step 1305, it is first checked whether the deletion waiting flag 1708 of the node 1790 concerned of the copy file table 1700 is set. If it is set, the control is shifted to step 1360 without performing the following copy back processing. If the deletion waiting flag 1708 is not set, it is judged in step 1306 whether the open waiting flag 1707 of the node 1790 is set. If the open waiting flag 1707 is judged to be set, the control is shifted to step 1320.

If neither the deletion waiting flag 1708 nor the open waiting flag 1707 is set, the process waits for a predetermined time in step 1307, and it is judged in step 1308 whether the time which is set as the copy back delay time has elapsed. If the copy delay time has not elapsed, the process returns to the step 1305. Here, the lapse time is a time which is counted from the start of the copy back routine. The waiting time in the step 1307 is set to one-tenth of the copy back delay time or less.

If the copy back delay time has elapsed or the open waiting flag 1707 is detected, the step 1320 is executed. In the step 1320, the read open number 1704 and the write open number 1705 of the copy file table are subjected to subtraction processing according to the open mode of the demanded file. That is, if the mode is set to only the read mode, "1" is subtracted from the read open number 1704. If the mode is set to only the write mode, "1" is subtracted from the write open number 1705. If the mode is set to the read write mode, "1" is subtracted from each of the read open number 1704 and the write open number 1705.

Subsequently, it is judged in step 1330 whether the demanded file is under the write open state. In subsequent 1331, on the basis of file information such as archive bits or the like which are provided by the OS 6b, it is judged whether the write-in operation for the file has been performed in step 1332, by judging whether the write open number 1705 is equal to zero, it is judged whether the write open is the last one. As a result of the above judgment, only if the write open is the last one and the write-in operation into the file has been performed, the copy back of the step 1333 is performed. If not so, the copy back as described above is not performed. The copy back of the step 1333 means a processing of returning/rewriting a copy of the demanded file created on the first information processing device 120 to the second information processing device 130. This processing is performed through the user process routine 32 of the agent program 30.

Subsequently, a judgment on the last close is made in step 1350. This judgment can be easily performed by judging whether both of the read open number 1704 and the write open number 1705 are equal to zero. In step 1351, it is judged whether the open waiting flag 1707 of the copy file table 1700 is set. If it is the last close and the open waiting flag is not set, the steps 1352 and 1355 are performed. In step 1352, the file size of the demanded file which is created on the first information processing device 120 is obtained, and it is made a sparse file in step 1355 to erase the content while keeping the file size.

In step 1358, the node 1790 concerned is erased from the copy file table 1700, and in step 1370 the copy back flag 1706 of the node 1790 concerned of the copy file tale 1700 is cleared. Finally, in step 1360 the node 1690 concerned is erased from the file handle table 1600, and the copy back process itself is finished in step 1399.

As described above, according to this routine, when the file erasing demand to the same file occurs during the copy back delay time, the copy back is ceased. Therefore, it is not necessary to perform an unnecessary copy back operation when the application program 8a creates a temporary file for work and then the close or the deletion to the file is instructed because the purpose of the file has been completed.

Furthermore, according to this routine, when the open demand to the same file comes during the copy back delay time, the copy back starts immediately to start the open processing as soon as possible.

Still furthermore, according to this routine, when the file open demand to the same file comes until the copy back is finished, the sparse-file making operation after the copy back is not performed. Therefore, the data copy of the file from the second server information processing device 130 is not necessary at the file open time as described above.

Figure 18:
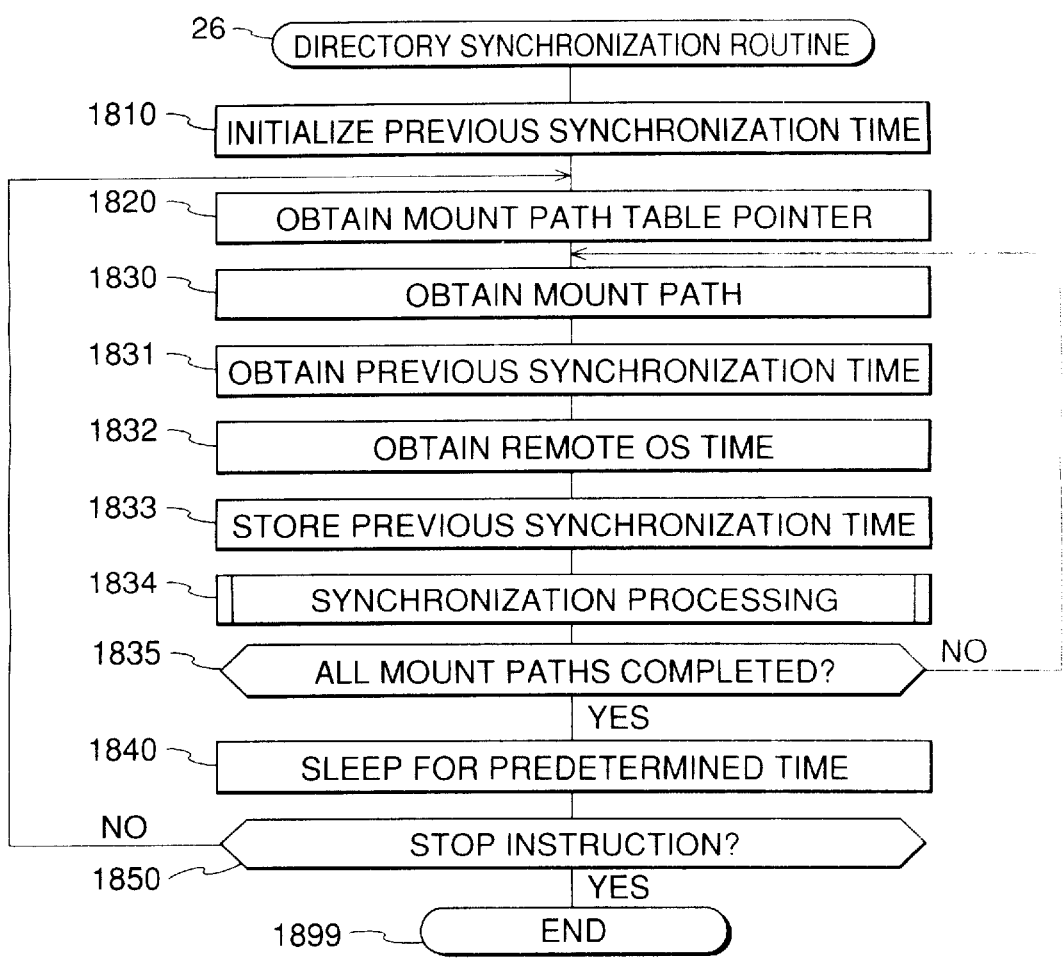
FIG. 18 is a flowchart for a process flow of a directory synchronizing routine 26 of the gateway program 20 of the embodiment shown in FIG. 1.

Next, the process flow of the directory synchronizing routine 26 will be described with references to FIG. 18.

In this routine, first, the synchronizing time which was previously set in step 1810 (hereinafter referred to as "previous synchronizing time") is initialized (i.e., it is set to 0 year, 0 month, 0 hour, 0 minute, 0 second). Subsequently, the head pointer 1401 of the mount path table 1400 is obtained in step 1820. In step 1830, the data pair of the mount path 1403 and the remote path 1404 are obtained from the node 1490 which is indicated by the obtained pointer.

Subsequently, the previous synchronizing time is obtained in step 1831 to inquire of the OS 6c of the second information processing device 130 about the time in step 1832, and the time which is obtained through the inquiry in step 1833 is stored as a new previous synchronizing time. Subsequently, the synchronization executing processing routine 27 is called in step 1834 to perform the synchronization processing to one mount path while using the mount path and the remote path obtained in step 1830 and the previous synchronizing time obtained in step 1831 as an argument.

In step 1835, whether the synchronization of all the mount paths is completed is judged by checking whether the pointer 1402 of the node 1490 of the mount path table 1400 which is referred to is "NULL". If the synchronization of all the mount paths is not finished, the step 1830 and the subsequent steps are executed again. If the synchronization of all the mount paths is finished, the process is kept under sleep in step 1840 for the time indicated by the directory synchronization interval time or until the signal indicating the stop instruction is received from the main routine 21.

In step 1850, it is judged whether the release from the sleep is caused by the stop instruction. If it is so, the directory synchronization routine is finished. If not so, the step 1820 and the subsequent steps are repetitively performed.

In the process flow as described above, in synchronizing target directories, only the differential directories between the first server information processing device 120 and the second server information processing device 130 can be updated and synchronized.

Figure 19:
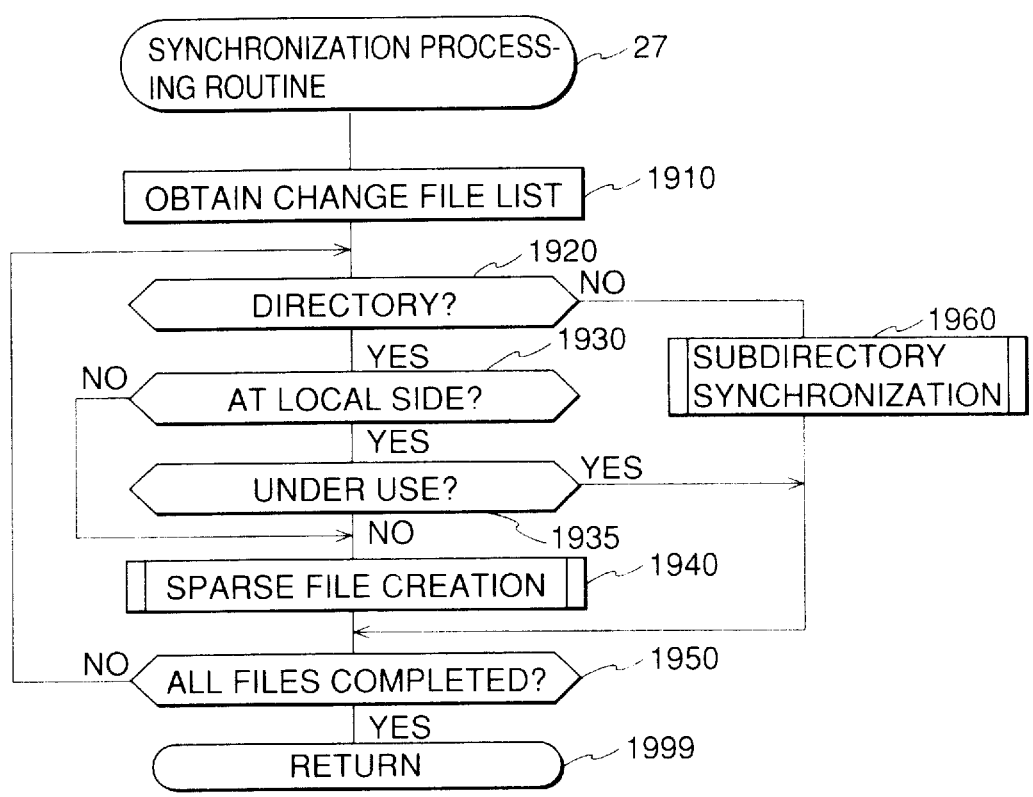
FIG. 19 is a flowchart for a process flow of a synchronization executing processing routine 27 of the gateway program 20 of the embodiment shown in FIG. 1.

Next, the process flow of the synchronization executing processing routine 27 will be described with reference to FIG. 19. First, in step 1910, the previous synchronizing time and the remote path which are delivered as the argument to this routine are delivered to the directory synchronizing service routine 33 of the agent program 30 on the second information processing device, and a list of the names, the file size and the file dates of files which are in a subordinate hierarchical portion of the remote path (containing directory files) and have been updated subsequently to the previous synchronizing time are received as a change file list.

In the step 1920 and the subsequent steps, the files and the directories listed are processed one by one. First, in step 1920 it is judged whether it is a directory file. If it is a directory file, the subdirectory synchronizing routine 28 is called in step 1960 to synchronize all the subordinate hierarchical portions of the directory. On the other hand, if it is a data file, in step 1930, it is judged whether the file has already existed in the corresponding mount path on the first information processing device 120. If the file does not exist, the step 1940 is performed. If the file exists, the step 1935 is performed.

In step 1935, it is searched whether the file concerned is registered in the copy file table 1700, and by this check it is judged whether the file concerned is under use. If the file concerned is registered in the copy file table 1700, the file is judged to be under use, and thus the process skips the creation of the sparse file of the step 1940. In step 1940, the sparse file making routine 60 is called by using the file name, the file size and the file date as an argument to erase the content of the file concerned and set the file size and the file date.

In step 1950, it is judged whether the synchronization of all the files of the updated file list which is obtained in step 1910 is finished, and the step 1920 and the subsequent steps are repeated until the synchronization is completed. If the synchronization is completed, the process returns to the caller in step 1999.

Figure 20:
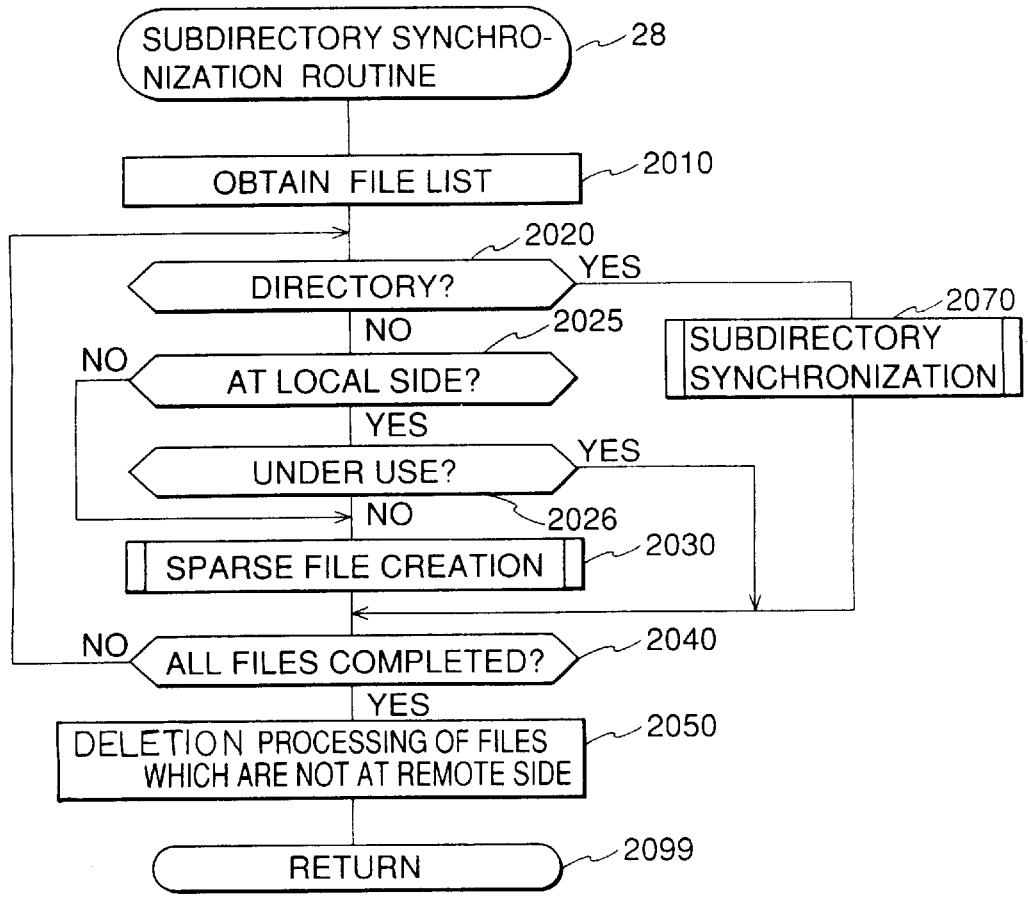
FIG. 20 is a flowchart for a process flow of a subdirectory synchronizing routine 28 of the gateway program 20 of the embodiment shown in FIG. 1.

Next, the process flow of the subdirectory synchronizing routine 28 which is called from the synchronization executing processing routine 27 will be described with reference to FIG. 20.

In step 2010, the file list beneath the directory which is received as an argument is obtained from the directory synchronization service routine 33 of the agent program 30 on the second information processing device. This list contains information on the name, the date and the size of each of the files and the directories.

In the step 2020 and the subsequent steps, the files and the directories of the file list are processed one by one. In step 2020, it is judged whether the file concerned is a directory file. If the file concerned is a directory file, the subdirectory synchronizing routine 28 is recursively called. If the file concerned is a file, in step 2025, it is checked whether the file concerned has already existed in the corresponding mount path on the first information processing device 120. If the file concerned does not exist, a step 2030 is executed. On the other hand, if not so, a step 2026 is executed.

In step 2026, it is searched whether the file concerned is registered in the copy file table 1700, and it is judged on the basis of the above search whether the file concerned is under use. If the file concerned is registered in the copy file table 1700, the file concerned is judged to be under use, and thus the process skips the sparse file making processing in step 2030. If the file concerned is not under use, the sparse file making routine 60 is called in step 2030 by using the name, the size and the date of the file as an argument to erase the content of the file concerned and set the file size and the file date.

In step 2040, it is judged whether the synchronization of all the files of the file directory list which is obtained in step 2010 is finished, and the step 2020 and the subsequent steps are repeated until the synchronization is finished. When the synchronization of all the files is finished, it is checked whether the files or directories which do not exist in the file directory list exist in the directory concerned at a local side in step 2050. If the files or directories exist, all the files or directories are erased. Thereafter, the above processing is finished, and the process returns to the caller in step 2099.

Figure 12:
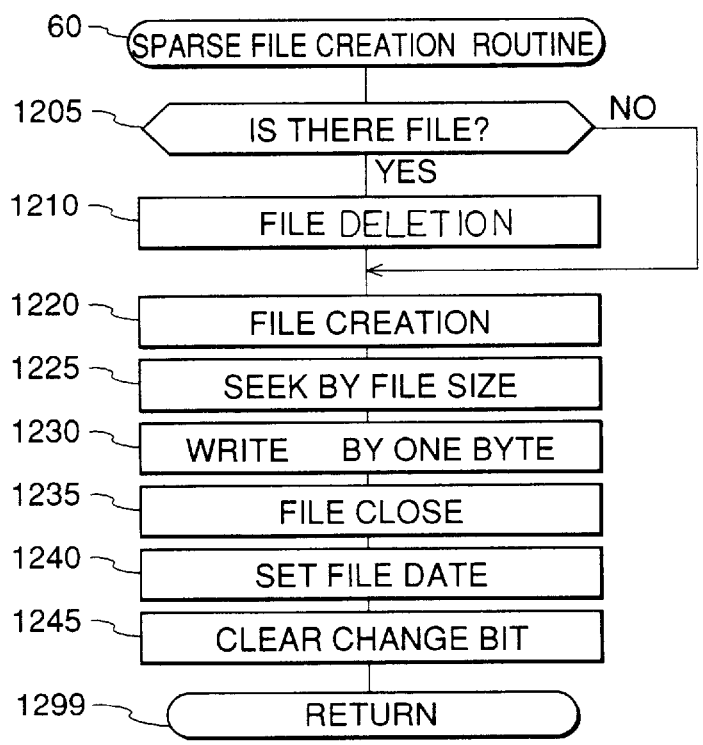
FIG. 12 is a flowchart for a process flow of a sparse file creating routine 60 of the gateway program 20 of the embodiment shown in FIG. 1.

Next, the process flow of the sparse file making routine 60 will be described with reference to FIG. 12.

First, in step 1205, it is checked whether a file having a file name which is received as an argument exists. If it exists, the file is erased in step 1210. Subsequently, a file is newly created in step 1220. In step 1225, the file pointer is shifted by an amount corresponding to the file size which is received as an argument, and dummy data of one byte are written in step 1230. Thereafter, the file concerned is closed in step 1235.

In step 1240, the date of the file concerned is changed to a date which is received as an argument, and in step 1245 a change bit which is one type of file attribute information is cleared. Thereafter, the processing of making the sparse file is completed, and the process returns to the caller in step 1299.

Next, the process flow of each routine contained in the agent program 30 will be described.

Figure 26:
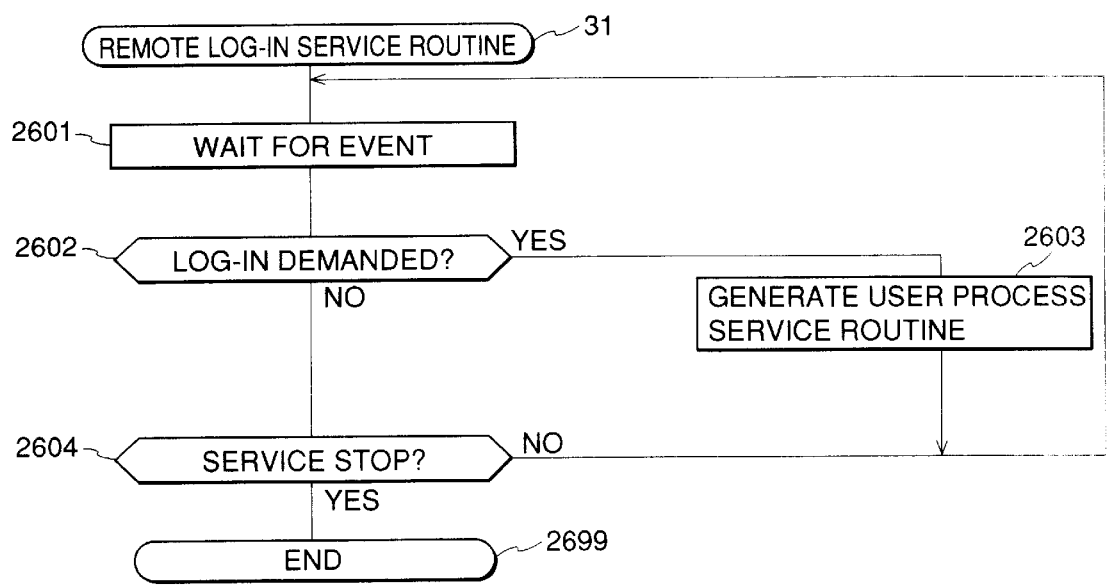
FIG. 26 is a flowchart for a process flow of a remote log-in service routine 31 of an agent program 30 in the embodiment shown in FIG. 1.

First, the remote log-in service routine 31 which receives a log-in demand from the user process routine 23 of the gateway program 20 as described above will be described with reference to FIG. 26.

In this processing, in step 2601, the process waits while monitoring an event such as a log-in demand or a service stop instruction from the user process routine 23. When the event occurs, in step 2602 it is judged whether the event is the log-in demand. If it is the log-in demand, in step 2603 the user process service routine 32 is started as a new process to start the execution of the log-in from this stage.

On the other hand, if the event is judged not to be the log-in in step 2602, it is judged whether the occurring event is the service stop instruction. If it is the service stop instruction, the process goes to a step 2699, and this processing is finished. If it is an event other than the service stop instruction, the process returns to the step 2601 to wait for the event.

Figure 27:
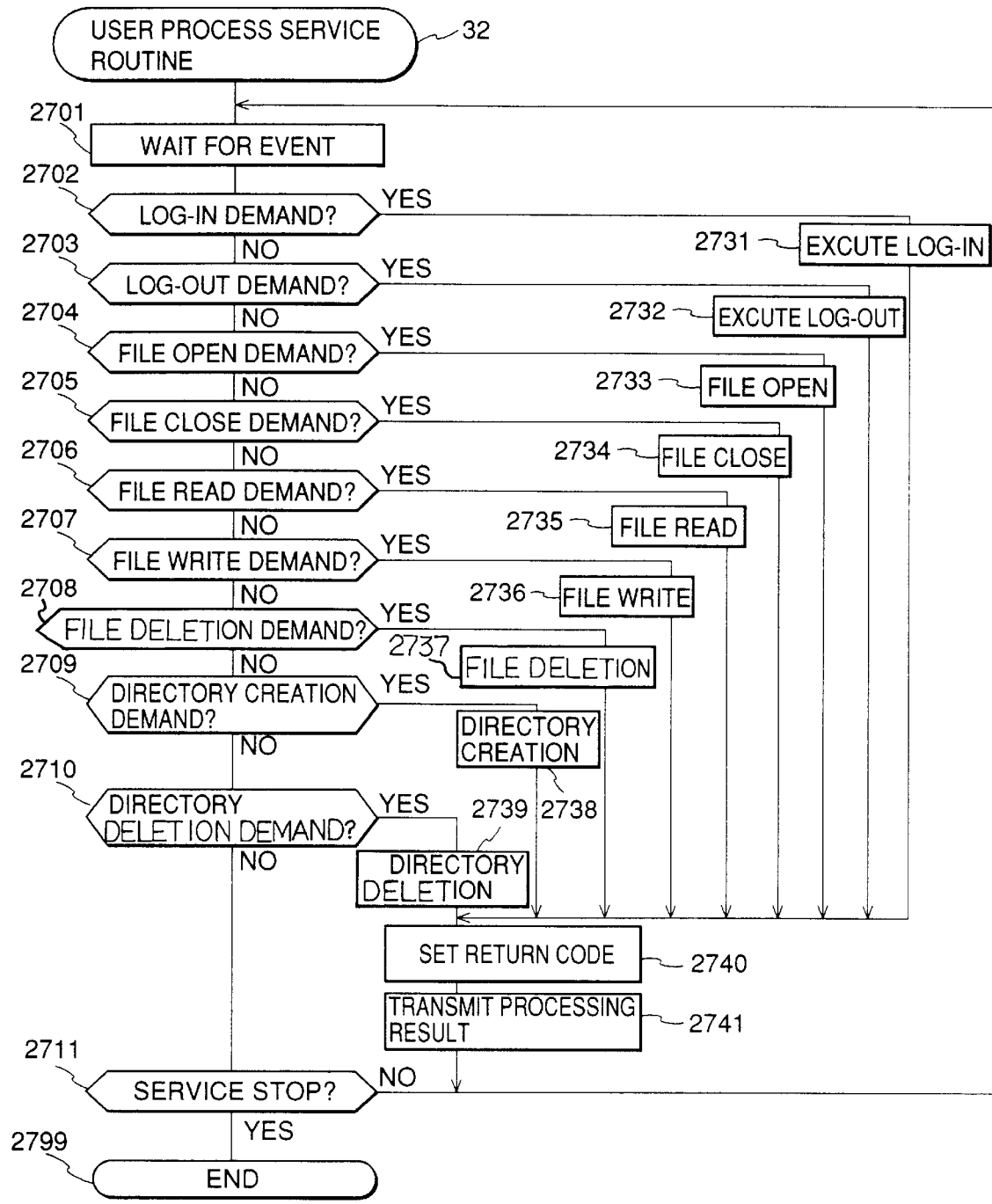
FIG. 27 is a flowchart for a process flow of a user process service routine 32 of the agent program 30 in the embodiment shown in FIG. 1.

Next, the process flow of the user process service routine 32 which is generated and started in step 2603 of the remote log-in service routine 31 and is responsive to various types of events which are re-directed from the respective routines of the gateway program 20 will be described with reference to FIG. 27.

This processing is started in step 2603 of the remote log-in service routine 31, and waits for the event in step 2701. Here, the events which are re-directed to this routine contain various types of file access demands from the file access hook routine 24, log-in and log-out demands from the remote log-in routine 22, etc.

In the judgment processing from the steps 2702 to 2710, it is judged whether the event corresponds to the log-in demand, the log-out demand, the file open demand, the file close demand, the file read demand, the file write demand, the file deletion demand, the directory creating demand or the directory deletion demand, and the corresponding processing of one of the steps 2731 to 2739 is performed in accordance with the judgment result.

Subsequently, in step 2740, a return code to transmit the processing result to each type demand is set by using the socket which is succeeded from the remote log-in service routine 31. In step 2741, the result of the processing which contains the return code is transmitted to the first server information processing device 120 through the socket to transmit the result to the issuer of the event, and then the process returns to the step 2701 to wait for an event.

If the event is an event other than the access demand which is recognized in the steps 2702 to 2710, it is judged whether the event is the service stop instruction. If it is the service stop instruction, the process goes to a step 2799 to finish this routine. If the event is an event other than the service stop instruction, the process returns to the step 2701 to wait for an event.

Figure 28:
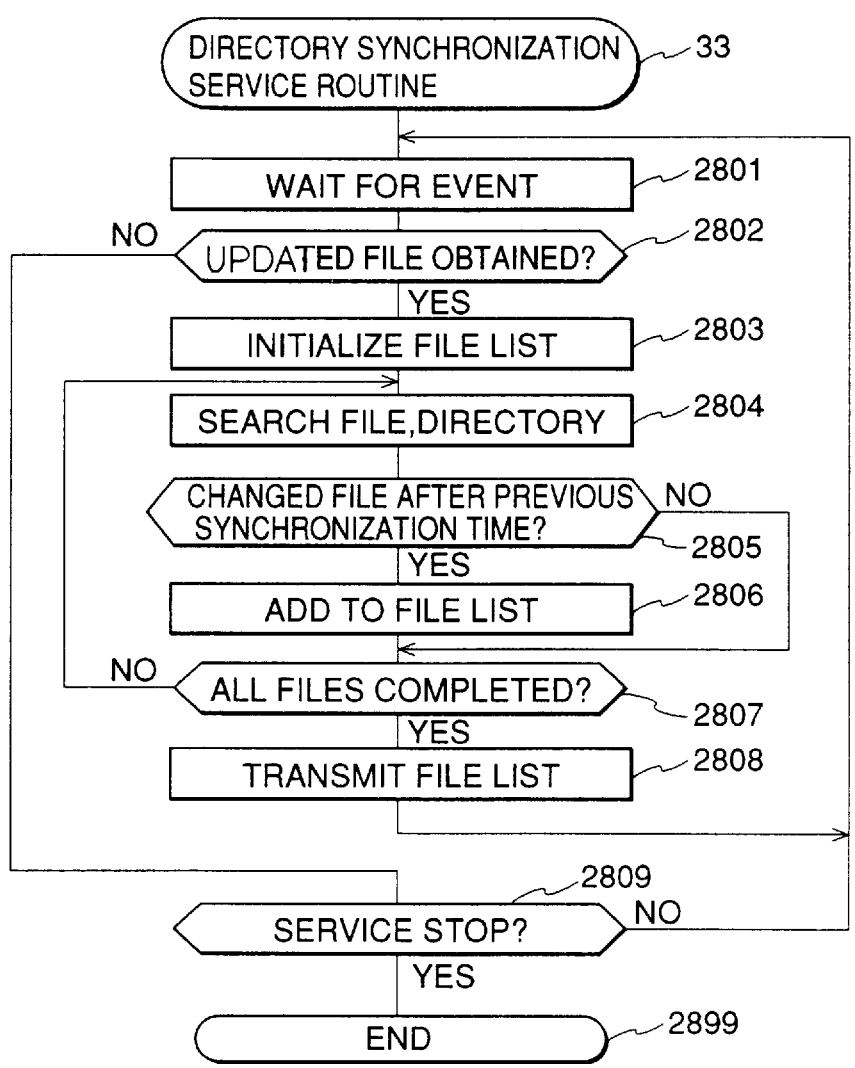
FIG. 28 is a flowchart for a process flow of a directory synchronizing service routine 33 of the agent program 30 in the embodiment shown in FIG. 1.

Next, the directory synchronization service routine 33 will be described with reference to FIG. 28.

This processing serves to creates a change file list on the directory structure of the second server information processing device 130 in accordance with the processing of the step 1910 of the synchronization executing processing routine 27 in response to a demand from the directory synchronizing routine 26 of the gateway program 20, and returns the created list.

In this processing, the process waits for an event in step 2801, and in step 2802 it is judged whether the event is a updated file obtaining instruction from the step 1910 of the synchronization executing processing routine 27. If the event is judged to be the updated file obtaining instruction, in step 2803 the updated file list is initialized, and in steps 2804 to 2807 a updated file list is created on the basis of the previous synchronization time which is contained as an argument in the updated file obtaining instruction and the remote path 1404 of the mount path table 1400.

That is, in step 2804, files and subdirectory files which are located at the subordinate hierarchical portion side of the remote path 1404 contained in the argument and contained in the directory structure of the second server information processing device 130 are successively searched, and in step 2805 it is judged whether the change has been made on each file subsequently to the synchronization time. If the change is judged to be made, in step 2806 the name of the corresponding file is added to the change file list. If the change is judged not to be made, the process goes to a step 2807. In step 2807, it is judged whether the search has been completed on all the files which are targets to be searched, and the above processing is repeated until the search has been completed.

In step 2808, the change file list which is obtained through the processing of the steps 2804 to 2807 is transmitted to the first server information processing device 120, and returned to the synchronization execution processing routine 27.

When the event is an event other than the updated file obtaining instruction, it is judged whether the event is a service stop instruction. If it is the service stop instruction, the process goes to a step 2899 to finish this routine. If the event is an event other than the service stop instruction, the process returns to the step 2801 to wait for an event.

The first server information processing device, the second server information processing device and the client information processing device perform the gateway program, the agent program and the client program respectively to realize the processing of the flowcharts shown in FIGS. 2 to 13, FIGS. 18 to 20 and FIGS. 26 to 28. These programs can be stored in a storage medium from which information can be read out by a computer, such as a hard disk device, a floppy disk device or a CD-ROM device. In order to perform the processing of the flowcharts of FIGS. 2 to 13, FIGS. 18 to 20 and FIGS. 26 to 28, the first server information processing device, the second server information processing device and the client information processing device read in the programs from the storage medium, and execute the programs.

According to the present invention, there can be provided an information processing system and a control method therefor in which the same operation performance as the case where an access is made to files on a server information processing device having a single file server program can be kept even when an access is made to files on plural server information processing devices having different file server programs.

According to the present invention, a file list display program for the first information processing device can be directly used by periodically copying the directory structure on the second server information processing device onto the first server information processing device.

According to the present invention, in the file creation process performed when the directory structure of the second server information processing device is periodically copied onto the first server information processing device, the normal files other than the directory files are made sparse files having no contents, whereby the capacity of the magnetic disk of the first information processing device which are used by the files can be reduced.

According to the present invention, only the files which have been changed after the previous directory synchronization execution time are set as synchronization processing targets. Therefore, the information amount to be transmitted from the second server information processing device to the first server information processing device can be reduced, so that the processing speed can be increased and the LAN traffic can be reduced.

According to the present invention, the copy processing can be prevented from being inefficiently carried out even when plural users use the same file at the same time. Further, when plural users are using a file or the file is re-opened after closed, the file concerned is not made a sparse file, and a copy file can be subsequently used. When a file is erased after closed, an unnecessary copy back is not required to be performed. The copy back means is operated under the background as another process, so that, the close demand from the client information processing device is finished without waiting for completion of the copy back means. Therefore, the next processing can be immediately performed.

Therefore, according to the present invention, the speed of the access processing to the files on the second server information processing device which are output from the client information processing device can be increased, and the LAN traffic can be reduced.

What is claimed is:

1. An information processing system including a first server information processing device having a first file service program which enables common use of files, a second server information processing device having a second file server program with an access interface to commonly-usable files which is different from that of said first file server program, and a network for connecting said first and second server information processing devices, wherein said first server information processing device includes access means for outputting a processing demand of an access to files which are managed by said second server information processing device, and said second server information processing device includes service means for receiving the processing demand supplied from said access means to perform the processing corresponding to the processing demand, and wherein said access means transmits a processing demand of information on the directory structure of at least a part of the directory structure of the files managed by said second server information processing device to said service means, and said service means receives the processing demand and transmits the information on the directory structure based on the processing demand from said access means at a predetermined timing.

2. An information processing system including a first server information processing device having a first file service program which enables common use of files, a second server information processing device having a second file server program with an access interface to commonly-usable files which is different from that of said first file server program, and a network for connecting said first and second server information processing devices, wherein said first server information processing device includes access means for outputting a processing demand of an access to files which are managed by said second server information processing device, and said second server information processing device includes service means for receiving the processing demand supplied from said access means to perform the processing corresponding to the processing demand, and wherein said access means transmits a processing demand of information on the directory structure of at least a part of the directory structure of the files managed by said second server information processing device to said service means, and said service means receives the processing demand and successively transmits the information on the directory structure based on the processing demand from said access means at a predetermined time interval.

3. An information processing system including a first server information processing device having a first file service program which enables common use of files, a second server information processing device having a second file server program with an access interface to commonly-usable files which is different from that of said first file server program, and a network for connecting said first and second server information processing devices, wherein said first server information processing device includes access means for outputting a processing demand of an access to files which are managed by said second server information processing device, and said second server information processing device includes service means for receiving the processing demand supplied from said access means to perform the processing corresponding to the processing demand, and wherein said access means transmits a processing demand of information on the directory structure of at least a part of the directory structure of the files managed by said second server information processing device to said service means, and said service means receives the processing demand which is successively output form said access means at the predetermined timing, and transmits the information on the directory structure based on the processing demand to said access means.

4. An information processing system including a first server information processing device having a first file service program which enables common use of files, a second server information processing device having a second file server program with an access interface to commonly-usable files which is different from that of said first file server program, and a network for connecting said first and second server information processing devices, wherein said first server information processing device includes access means for outputting a processing demand of an access to files which are managed by said second server information processing device, and said second server information processing device includes service means for receiving the processing demand supplied from said access means to perform the processing corresponding to the processing demand, and wherein said access means transmits a processing demand of information on the directory structure of at least a part of the directory structure of the files managed by said second server information processing device to said service means, and said service means receives the processing demand which is successively output from said access means at the predetermined time interval, and transmits the information on the directory structure based on the processing demand to said access means.

5. An information processing system including a first server information processing device having a first file service program which enables common use of files, a second server information processing device having a second file server program with an access interface to commonly-usable files which is different from that of said first file server program, and a network for connecting said first and second server information processing devices, wherein said first server information processing device includes access means for outputting a processing demand of an access to files which are managed by said second server information processing device, and said second server information processing device includes service means for receiving the processing demand supplied from said access means to perform the processing corresponding to the processing demand, and wherein said access means transmits a processing demand of information on the directory structure of at least a part of the directory structure of the files managed by said second server information processing device to said service means, and said service means receives the processing demand and transmits, to said access means, the information on the directory structure based on the processing demand from said access means and file information, wherein the file information to be transmitted to said access means is different from actual file information which is specified by the information on the directory structure.

6. An information processing system including a first server information processing device having a first file service program which enables common use of files, a second server information processing device having a second file server program with an access interface to commonly-usable files which is different from that of said first file server program, and a network for connecting said first and second server information processing devices, wherein said first server information processing device includes access means for outputting a processing demand of an access to files which are managed by said second server information processing device, and said second server information processing device includes service means for receiving the processing demand supplied from said access means to perform the processing corresponding to the processing demand, and wherein said access means transmits a processing demand of information on the directory structure of at least a part of the directory structure of the files managed by said second server information processing device to said service means, and said service means receives the processing demand and transmits, to said access means, the information on the directory structure based on the processing demand from said access means and file information which is specified by the information on the directory structure, wherein the file information to be transmitted to said access means in non-entity file information which is obtained by imitating actual file information which is specified by the information on the directory structure.

7. An information processing method for an information processing system which includes a first server information processing device having a first file service program which enables common use of files, a second server information processing device having a second file server program with an access interface to commonly-usable files which is different from that of said first file server program, and a network for connecting said first and second server information processing devices through which an access is mutually performed between said first and second server information processing devices, the method comprising the steps of:

outputting a processing demand on information on at least a part of the directory structure of files managed by the second server information processing device from said first server information processing device to said second server information processing device; and receiving the processing demand from said first server information processing device by said second server information processing device to perform the processing corresponding to the processing demand, and transmitting the information on the directory structure based on the processing demand from said second server information processing device to said first server information processing device, wherein said second server information processing device transmits the information on the directory structure based on the processing demand from said first server information processing device at a predetermined timing.

8. An information processing method for an information processing system which includes a first server information processing device having a first file service program which enables common use of files, a second server information processing device having a second file server program with an access interface to commonly-usable files which is different from that of said first file server program, and a network for connecting said first and second server information processing devices through which an access is mutually performed between said first and second server information processing devices, the method comprising the steps of:

outputting a processing demand on information on at least a part of the directory structure of files managed by the second server information processing device from said first server information processing device to said second server information processing device; and receiving the processing demand from said first server information processing device by said second server information processing device to perform the processing corresponding to the processing demand, and transmitting the information on the directory structure based on the processing demand from said second server information processing device to said first server information processing device, wherein said second server information processing device successively transmits the information on the directory structure based on the processing demand from said first server information processing device at a predetermined time interval.

9. An information processing method for an information processing system which includes a first server information processing device having a first file service program which enables common use of files, a second server information processing device having a second file server program with an access interface to commonly-usable files which is different from that of said first file server program, and a network for connecting said first and second server information processing devices through which an access is mutually performed between said first and second server information processing devices, the method comprising the steps of:

outputting a processing demand on information on at least a part of the directory structure of files managed by the second server information processing device from said first server information processing device to said second server information processing device; and receiving the processing demand from said first server information processing device by said second server information processing device to perform the processing corresponding to the processing demand, and transmitting the information on the directory structure based on the processing demand from said second server information processing device to said first server information processing device, wherein said second server information processing device receives the processing demand from said first server information processing device which is successively instructed at a predetermined timing, and transmits the information on the directory structure based on the processing demand to said first server information processing device.

10. An information processing method for an information processing system which includes a first server information processing device having a first file service program which enables common use of files, a second server information processing device having a second file server program with an access interface to commonly-usable files which is different from that of said first file server program, and a network for connecting said first and second server information processing devices through which an access is mutually performed between said first and second server information processing devices, the method comprising the steps of:

outputting a processing demand on information on at least a part of the directory structure of files managed by the second server information processing device from said first server information processing device to said second server information processing device; and receiving the processing demand from said first server information processing device by said second server information processing device to perform the processing corresponding to the processing demand, and transmitting the information on the directory structure based on the processing demand from said second server information processing device to said first server information processing device, wherein said second server information processing device receives the processing demand from said first server information processing device which is successively instructed at a predetermined time interval, and transmits the information on the directory structure based on the processing demand to said first server information processing device.

11. An information processing method for an information processing system which includes a first server information processing device having a first file service program which enables common use of files, a second server information processing device having a second file server program with an access interface to commonly-usable files which is different from that of said first file server program, and a network for connecting said first and second server information processing devices through which an access is mutually performed between said first and second server information processing devices, the method comprising the steps of:

outputting a processing demand on information on at least a part of the directory structure of files managed by the second server information processing device from said first server information processing device to said second server information processing device; and receiving the processing demand from said first server information processing device by said second server information processing device to perform the processing corresponding to the processing demand, and transmitting the information on the directory structure based on the processing demand from said second server information processing device to said first server information processing device, wherein said second server information processing device transmits to said first server information processing device the information on the directory structure based on the processing demand from said first server information processing device and file information which is different from actual file information which is specified by the information on the directory structure.

12. An information processing method for an information processing system which includes a first server information processing device having a first file service program which enables common use of files, a second server information processing device having a second file server program with an access interface to commonly-usable files which is different from that of said first file server program, and a network for connecting said first and second server information processing devices through which an access is mutually performed between said first and second server information processing devices, the method comprising the steps of:

outputting a processing demand on information on at least a part of the directory structure of files managed by the second server information processing device from said first server information processing device to said second server information processing device; and receiving the processing demand from said first server information processing device by said second server information processing device to perform the processing corresponding to the processing demand, and transmitting the information on the directory structure based on the processing demand from said second server information processing device to said first server information processing device, wherein said second server information processing device transmits to said first server information processing device the information on the directory structure based on the processing demand from said first server information processing device and file information which is specified by the information on the directory structure and which has no entity which is obtained by imitating actual file information which is specified by the information on the directory structure.

13. A storage medium storing an information processing program for an information processing system which includes a first server information processing device having a first file service program which enables common use of files, a second server information processing device having a second file server program with an access interface to commonly-usable files which is different from that of said first file server program, and a network for connecting said first and second server information processing devices through which an access is mutually performed between said first and second server information processing devices, said storage medium being stored with information processing programs to perform the mutual access between said first and second server information processing devices, wherein on the basis of the information processing programs, said first server information processing device outputs to said second information processing device a processing demand of information on the directory structure of at least a part of the directory structure of files managed by said second server information processing device, and said second server information processing device receives the processing demand from said first server information processing device to perform the processing corresponding to the processing demand, and transmits the information on the directory structure based on the processing demand from said first server information processing device at a predetermining timing.

14. A storage medium storing an information processing program for an information processing system which includes a first server information processing device having a first file service program which enables common use of files, a second server information processing device having a second file server program with an access interface to commonly-usable files which is different from that of said first file server program, and a network for connecting said first and second server information processing devices through which an access is mutually performed between said first and second server information processing devices, said storage medium being stored with information processing programs to perform the mutual access between said first and second server information processing devices, wherein on the basis of the information processing programs, said first server information processing device outputs to said second information processing device a processing demand of information on the directory structure of at least a part of the directory structure of files managed by said second server information processing device, and said second server information processing device receives the processing demand from said first server information processing device to perform the processing corresponding to the processing demand, and successively transmits the information on the directory structure based on the processing demand from said first server information processing device at a predetermined time interval.

15. A storage medium storing an information processing program for an information processing system which includes a first server information processing device having a first file service program which enables common use of files, a second server information processing device having a second file server program with an access interface to commonly-usable files which is different from that of said first file server program, and a network for connecting said first and second server information processing devices through which an access is mutually performed between said first and second server information processing devices, said storage medium being stored with information processing programs to perform the mutual access between said first and second server information processing devices, wherein on the basis of the information processing programs, said first server information processing device outputs to said second information processing device a processing demand of information on the directory structure of at least a part of the directory structure of files managed by said second server information processing device, and said second server information processing device receives the processing demand from said first server information processing device which is successively output at a predetermined timing to perform the processing corresponding to the processing demand, and transmits the information on the directory structure based on the processing demand to said first server information processing device.

16. A storage medium storing an information processing program for an information processing system which includes a first server information processing device having a first file service program which enables common use of files, a second server information processing device having a second file server program with an access interface to commonly-usable files which is different from that of said first file server program, and a network for connecting said first and second server information processing devices through which an access is mutually performed between said first and second server information processing devices, said storage medium being stored with information processing programs to perform the mutual access between said first and second server information processing devices, wherein on the basis of the information processing programs, said first server information processing device outputs to said second information processing device a processing demand of information on the directory structure of at least a part of the directory structure of files managed by said second server information processing device, and said second server information processing device receives the processing demand from said first server information processing device which is successively output at a predetermined time interval to perform the processing corresponding to the processing demand, and transmits the information on the directory structure based on the processing demand to said first server information processing device.

17. A storage medium storing an information processing program for an information processing system which includes a first server information processing device having a first file service program which enables common use of files, a second server information processing device having a second file server program with an access interface to commonly-usable files which is different from that of said first file server program, and a network for connecting said first and second server information processing devices through which an access is mutually performed between said first and second server information processing devices, said storage medium being stored with information processing programs to perform the mutual access between said first and second server information processing devices, wherein on the basis of the information processing programs, said first server information processing device outputs to said second information processing device a processing demand of information on the directory structure of at least a part of the directory structure of files managed by said second server information processing device, and said second server information processing device receives the processing demand from said first server information processing device to perform the processing corresponding to the processing demand and transmits, to said first information processing device, the information on the directory structure based on the processing demand from said first server information processing device and file information, wherein the file information to be transmitted to said first server information processing device is different from actual file information which is specified by the information on the directory structure.

18. A storage medium storing an information processing program for an information processing system which includes a first server information processing device having a first file service program which enables common use of files, a second server information processing device having a second file server program with an access interface to commonly-usable files which is different from that of said first file server program, and a network for connecting said first and second server information processing devices through which an access is mutually performed between said first and second server information processing devices, said storage medium being stored with information processing programs to perform the mutual access between said first and second server information processing devices, wherein on the basis of the information processing programs, said first server information processing device outputs to said second information processing device a processing demand of information on the directory structure of at least a part of the directory structure of files managed by said second server information processing device, and said second server information processing device receives the processing demand from said first server information processing device to perform the processing corresponding to the processing demand and transmits, to said first information processing device, the information on the directory structure based on the processing demand from said first server information processing device and file information which is specified by the information on the directory structure, wherein the file information to be transmitted to said first server information processing device is file information having no entity which is obtained by imitating file information having no entity which is obtained by imitating actual file information which is specified by the information on the directory structure.

19. An information processing system including a first server information processing device having a first file service program which enables common use of files, a second server information processing device having a second file server program with an access interface to commonly-usable files which is different from that of said first file server program, and a network for connecting said first and second server information processing devices, wherein said first server information processing includes access means for outputting a processing demand of an access to files managed by said second server information processing device, and said second server information processing device includes service means for receiving the processing demand from said access means to perform the processing corresponding to the processing demand, and wherein said access means includes directory synchronizing means for detecting information on the structure of at least a part of the directory structure of files managed by said second server information processing device through said service means to create a copy of the directory structure of the files managed by said second server information processing device in accordance with the detected information, the directory structure being formatted so as to be managed by said first file server program, and add the copy of the directory structure of the files managed by said second server information processing device into the directory structure of files managed by said first file server program, and also performing the detection of the information at a predetermined timing to update the copy of the directory structure of the files managed by said second server information processing device every time the detection of the information is performed.

20. The information processing system as claimed in claim 19, wherein said directory synchronizing means includes storage means for storing a previous synchronization time, search means for searching, through said service means, files which have been changed subsequently to the stored previous synchronization time in files which are managed by said second server information processing device and contained in at least a part of the directory structure which is a target to be copied, and update means for updating the copy of the directory structure of the files managed by said second server information processing device for the searched files.

21. The information processing system as claimed in claim 20, wherein said service means includes directory synchronizing service means for receiving a search demand to files to be updated which is transmitted from said directory synchronizing means, searching files which have been changed after the previous synchronizing time and are contained in those files which are managed by said second server information processing device and contained in at least a part of the directory structure which is a target to be copied, and then returning information on the changed files to said directory synchronizing means.

22. The information processing system as claimed in claim 19, wherein in the copy process of the directory structure of the files managed by said second server information processing device, when a file which is managed by said second server information processing and is to be copied is a normal file other than the directory file, said directory synchronizing means does not copy data stored in the file concerned which is managed by said second server information processing device.

23. The information processing system as claimed in claim 19, wherein in the copy process of the directory structure the files managed by said second server information processing device, when a file which is managed by said second server information processing and is to be copied is a normal file other than the directory file, the file to be created is a sparse file in which dummy data are written only at the same position as the last data position of the file concerned which is managed by said second server information processing device.

24. The information processing system as claimed in claim 19, wherein said directory synchronizing means creates the copy of the directory structure of the files managed by said second server information processing device so that the capacity of a storage area occupied by the copy of the directory structure of the files managed by said second server information processing device is smaller than the capacity of a storage area occupied by the directory structure of said second server information processing device which serves as an origin for the copy.

25. The information processing system as claimed in claim 19, wherein in the copy process of the directory structure of the files managed by said second server information device, said directory synchronizing means sets the file date and the file size of files contained in the copy of the directory structure of the files managed by said second server information processing device to be identical to the file date and the file size of the files which are managed by said second server information processing device serving as an origin for the copy.

26. An information processing system including a first server information processing device having a first file service program which enables common use of files, a second server information processing device with a second file server program having an access interface to commonly-usable files which is different from that of said first file server program, at least one client information processing device, having display means, which has a client program for accessing the commonly-usable files on said first server information processing device through said first file server program, and a network for connecting said first and second server information processing devices and said at least one client information processing device, wherein said first server information processing device includes access means for accessing a file which is managed by said second server information processing device, and said second server information processing device includes service means which is operated in accordance with the access means, and wherein said access means receives a file processing demand transmitted from each client program to judge whether the file processing demand contains a processing demand to a file managed by said second file server program, converts the processing demand of the file managed by said second file server program contained in the file processing demand to a second processing demand which can be used by said second file server program, and transmits the second processing demand to said second server information processing device if the file processing demand is Judged to contain the processing demand to the file, and includes hook means for hooking an access to the file managed by said second server information processing device which is transmitted from each client program, file copy means for copying the data of the file concerned through said service means into the directory structure managed by said first file server program if the access is an open demand to the file managed by said second server information processing device, copy back means for copying back the file copied by said file copy means through said service means to said second server information processing device, and copy back start means for starting said copy back means as another process if the access is a close demand to the file managed by said second server information processing device, and said service means receives the second processing demand from said first server information processing device to perform a processing which is predetermined in accordance with the second processing demand.

27. The information processing system as claimed in claim 26, wherein said access means completes the close demand to the file managed by said second information processing device without waiting for completion of a copy back processing by said copy back means, and continuously receives a processing subsequent to the close demand from said client program.

28. The information processing system as claimed in claim 26, wherein said file copy means checks whether the copy of the data of the file has already existed, and performs no copy processing if the copy is judged to exist.

29. The information processing system as claimed in claim 26, wherein said copy back means erases the data of the file which is copied by said file copy means after the copy back processing.

30. The information processing system as claimed in claim 29, wherein said copy back means does not erase data after the copy back processing is finished when another open demand to the file concerned other than the open demand corresponding to the close demand is issued.

31. The information processing system as claimed in claim 29, wherein the deletion of the data is performed by making the file concerned a sparse file in which dummy data are written only at the same position as the last data position of an original file for the copy.

32. The information processing system as claimed in claim 29, wherein said copy back means does not erase the data of the file concerned after the copy back processing when the open demand to the file concerned is issued subsequently to the close demand to the file concerned.

33. The information processing system as claimed in claim 26, wherein said copy back means delays the start of the copy back processing by a predetermined time, and performs no copy back processing when a deletion demand to the file concerned is issued subsequently to the close demand to the file concerned within the delay time.

34. The information processing system as claimed in claim 33, wherein said copy back means ceases the delay and immediately perform the copy back processing when the open demand to the file concerned is issued subsequently to the close demand within the delay time.

35. The information processing system as claimed in claim 26, wherein said copy back means performs the copy back processing only when another open demand in a write mode to the file concerned is issued.

36. The information processing system as claimed in claim 26, wherein said copy back means checks one of attributes of the copied file, which indicates whether a correction processing is performed on the data stored in the file concerned, and performs the copy back processing only when the attribute indicates the correction of the data.

37. The information processing system as claimed in claim 36, wherein the attribute is an archive bit indicating the necessity of the backup of the file.

38. The information processing system as claimed in claim 26, wherein said file copy means performs an open processing on files managed by said second server information processing device through said service means before the file copy processing, and retries the open processing until the opening processing succeeds in the case where the open processing becomes an error because the open processing is beyond the restriction of the number of files which can be simultaneously opened in said second server program.

39. An information processing system including a first server information processing device having a first file service program which enables common use of files, a second server information processing device with a second file server program having an access interface to commonly-usable files which is different from that of said first file server program, at least one client information processing device, having display means, which has a client program for accessing the commonly-usable files on said first server information processing device through said first file server program, and a network for connecting said first and second server information processing devices and said at least one client information processing device, wherein said first server information processing device includes access means for accessing a file which is managed by said second server information processing device, and said second server information processing device includes service means which is operated in accordance with the access means, and wherein said access means receives a file processing demand transmitted from each client program to judge whether the file processing demand contains a processing demand to a file managed by said second file server program, converts the processing demand of the file managed by said second file server program contained in the file processing demand to a second processing demand which can be used by said second file server program, and transmits the second processing demand to said second server information processing device if the file processing demand is judged to contain the processing demand to the file, and said service means receives the second processing demand from said first server information processing device to perform a processing which is predetermined in accordance with the second processing demand and includes remote log-in service means for receiving a log-in demand for starting an access to files managed by said second server information processing device, which is transmitted from said first server information processing device, and starting, every received log-in demand, user process service means for processing an access demand to the files managed by said second server information processing device.

40. The information processing system as claimed in claim 39, wherein said user process service means receives an access demand from said client program which is re-directed by said first server information processing device to perform the processing corresponding to the access demand on the corresponding file managed by said second server information processing device, and transmitting the processing result to said first server information processing device.

41. An information processing system including a first server information processing device having a first file service program which enables common use of files, a second server information processing device with a second file server program having an access interface to commonly-usable files which is different from that of said first file server program, at least one client information processing device having a client program for accessing the commonly-usable files on said first server information processing device through said first file server program, and a network for connecting said first and second server information processing devices and said at least one client information processing device, wherein said first server information processing device includes access means for accessing a file which is managed by said second server information processing device, said second server information processing device includes service means which is operated in accordance with said access means, and said access means includes hook means for hooking an access to the file managed by said second server information processing device which is transmitted from each client program, file copy means for copying the data of the file concerned through said service means into the directory structure managed by said first file server program if the access is an open demand to the file managed by said second server information processing device, copy back means for copying back the file copied by said file copy means through said service means to the origin for the copy, copy back start means for starting said copy back means as another process if the access is a close demand to the file managed by said second server information processing device, and directory synchronizing means for detecting information on the directory structure of at least a part of the directory structure of files managed by said second server information processing device through said service means to create a copy of the directory structure of the files managed by said second server information processing device in accordance with the detected information, the directory structure being formatted so as to be managed by said first file server program, and add the copy of the directory structure of the files managed by said second server information processing device into the directory structure of files managed by said first file server program, and also performing the detection of the information periodically to update the copy of the directory structure of the files managed by said second server information processing device every time the detection of the information is performed.

42. A control method for an information processing system including a first server information processing device having a first file service program which enables common use of files, a second server information processing device with a second file server program having an access interface to commonly-usable files which is different from that of said first file server program, at least one client information processing device having a client program for accessing the commonly-usable files on said first server information processing device through said first file server program, and a network for connecting said first and second server information processing devices and said at least one client information processing device, whereby a mutual access between information processing systems is enabled, characterized by comprising the steps of:

detecting information on the structure of at least a part of the directory structure of files managed by said second server information processing device to create a copy of the directory structure of the files managed by said second server information processing device in accordance with the detected information, the directory structure thus created being formatted so as to be managed by said first file server program, and add the copy of the directory structure of the files managed by said second server information processing device into the directory structure of files managed by said first file server program; and performing the detection of the information at a predetermined timing to update the copy of the directory structure of the files managed by said second server information processing device every time the detection of the information is performed.

43. A control method for an information processing system including a first server information processing device having a first file service program which enables common use of files, a second server information processing device with a second file server program having an access interface to commonly-usable files which is different from that of said first file server program, at least one client information processing device having a client program for accessing the commonly-usable files on said first server information processing device through said first file server program, and a network for connecting said first and second server information processing devices and said at least one client information processing device, whereby a mutual access between information processing systems is enabled, characterized by comprising the steps of:

hooking an access to a file managed by said second server information processing device, which is transmitted from said client program;

copying data of a file managed by said second server information processing device into the directory structure managed by said first file server program when the access is an open demand to the file managed by said second server information processing device;

copying back the file copied by file copy means through service means to said second server information processing device; and starting copy back means as another process when the access is a close demand to a file managed by said second server information processing device.

44. A server information processing device which has a first file server program enabling common use of files and is connected through a network to a second server information processing device with a second file server program having a different access interface to commonly-usable files from said first file server program, including access means for accessing files managed by said second information processing device, wherein said access means includes directory synchronizing means for detecting information on the structure of at least a part of the directory structure of files managed by said second server information processing device to create a copy of the directory structure of the files managed by said second server information processing device in accordance with the detected information, the directory structure being formatted so as to be managed by said first file server program, and add the copy of the directory structure of the files managed by said second server information processing device into the directory structure of files managed by said first file server program, and also performing the detection of the information periodically to update the copy of the directory structure of the files managed by said second server information processing device every time the detection of the information is performed.

45. A server information processing device which has a first file server program enabling common use of files and is connected through a network to a second server information processing device with a second file server program having a different an access interface to commonly-usable files from said first file server program and at least client information processing device having a client program for accessing the commonly-usable files through said first file server program, including access means for accessing files managed by said second server information processing device, wherein said access means includes hook means for hooking an access to a file managed by said second server information processing device which is transmitted from each client program, file copy means for copying the data of the file concerned into the directory structure managed by said first file server program if the access is an open demand to the file managed by said second server information processing device, copy back means for copying back the file copied by said file copy means to the origin for the copy, and copy back start means for starting said copy back means as another process if the access is a close demand to the file managed by said second server information processing device.

* * * * *